US010732090B2

(12) United States Patent
Muraki

(10) Patent No.: US 10,732,090 B2
(45) Date of Patent: Aug. 4, 2020

(54) FINE PARTICLE ANALYZING APPARATUS, FINE PARTICLE ANALYZING METHOD, PROGRAM, AND FINE PARTICLE ANALYZING SYSTEM

(71) Applicant: Sony Corporation, Tokyo (JP)

(72) Inventor: Yosuke Muraki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/707,597

(22) Filed: Sep. 18, 2017

(65) Prior Publication Data

US 2018/0067035 A1   Mar. 8, 2018

Related U.S. Application Data

(63) Continuation of application No. 14/772,506, filed as application No. PCT/JP2014/054595 on Feb. 19, 2014.

(30) Foreign Application Priority Data

Mar. 15, 2013  (JP) .................................. 2013-052930
Sep. 25, 2013  (JP) .................................. 2013-198195

(51) Int. Cl.
  *G01N 15/14*   (2006.01)
  *G01N 21/64*   (2006.01)
  *G01N 15/10*   (2006.01)

(52) U.S. Cl.
  CPC ..... *G01N 15/1429* (2013.01); *G01N 15/1459* (2013.01); *G01N 21/6486* (2013.01);
  (Continued)

(58) Field of Classification Search
  CPC .................................................. G01N 15/1429
  See application file for complete search history.

(56) References Cited

U.S. PATENT DOCUMENTS 4,845,653  A  *  7/1989  Conrad ............... G06F 3/04842
                                                      715/805
7,112,806  B2 *  9/2006  Lussier .............. G01N 21/6456
                                                      250/458.1
(Continued)

FOREIGN PATENT DOCUMENTS

EP    2 085 758 A2   8/2009
EP    2 085 759 A2   8/2009
(Continued)

OTHER PUBLICATIONS

International Search Report and Written Opinion and English translation thereof dated May 27, 2014 in connection with International Application No. PCT/JP2014/054595.
(Continued)

*Primary Examiner* — David P Porta
*Assistant Examiner* — Jeremy S Valentiner
(74) *Attorney, Agent, or Firm* — Wolf, Greenfield & Sacks, P.C.

(57) ABSTRACT

Provided are a fine particle analyzing apparatus, a fine particle analyzing method, a program, and a fine particle analyzing system, which are capable of easily separating a plurality of types of spectral data on fluorescence emitted from a fine particle.
A data extracting unit included in the fine particle analyzing apparatus selectively extracts spectral data, which contain predetermined information, from spectral data on fluorescence emitted from a fine particle. The data extracting unit selectively extracts spectral data indicating the maximum intensity in a wavelength area set beforehand from one or a plurality of types of spectral data indicating intensity of fluorescence emitted from the fine particle for each of a plurality of wavelengths.

18 Claims, 23 Drawing Sheets

(52) U.S. Cl.
CPC ........... *G01N 2015/1006* (2013.01); *G01N 2015/149* (2013.01); *G01N 2021/6421* (2013.01); *G01N 2201/06113* (2013.01); *G01N 2201/12* (2013.01)

(56) References Cited

U.S. PATENT DOCUMENTS

| | | | |
|---|---|---|---|
| 2007/0179715 A1* | 8/2007 | Ariyoshi | G01N 15/1459 702/19 |
| 2008/0212866 A1 | 9/2008 | Lett et al. | |
| 2009/0190121 A1 | 7/2009 | Hegyi et al. | |
| 2009/0194705 A1 | 8/2009 | Kiesel et al. | |
| 2009/0195773 A1 | 8/2009 | Bassler et al. | |
| 2010/0155577 A1 | 6/2010 | Kiesel et al. | |
| 2011/0267352 A1 | 11/2011 | Sakai | |
| 2012/0049086 A1* | 3/2012 | Sakai | G01N 21/274 250/459.1 |
| 2012/0056103 A1 | 3/2012 | Sakai | |
| 2013/0026391 A1* | 1/2013 | Sekino | G01N 21/6408 250/459.1 |
| 2013/0065269 A1* | 3/2013 | Nitta | G01N 21/274 435/34 |
| 2014/0024020 A1 | 1/2014 | Tanabe | |
| 2014/0133733 A1 | 5/2014 | Grady et al. | |
| 2016/0011095 A1 | 1/2016 | Muraki | |

FOREIGN PATENT DOCUMENTS

| | | | | |
|---|---|---|---|---|
| EP | 2 085 760 A2 | 8/2009 | | |
| EP | 2 085 761 A2 | 8/2009 | | |
| EP | 2 085 762 A2 | 8/2009 | | |
| EP | 2 426 481 A1 | 3/2012 | | |
| EP | 2 551 665 A1 | 1/2013 | | |
| JP | 2009-180724 A | 8/2009 | | |
| JP | 2011-232254 A | 11/2011 | | |
| JP | 2012-047462 A | 3/2012 | | |
| JP | 2012-052985 A | 3/2012 | | |
| JP | 2013-024792 A | 2/2013 | | |
| WO | WO-2012008129 A1 * | 1/2012 | ......... | G01N 15/1012 |
| WO | WO-2012141019 A1 * | 10/2012 | ......... | G01N 21/6408 |

OTHER PUBLICATIONS

International Preliminary Report on Patentability and English translation thereof dated Sep. 24, 2015 in connection with International Application No. PCT/JP2014/054595.

\* cited by examiner

A

B

FINE PARTICLE ANALYZING APPARATUS, FINE PARTICLE ANALYZING METHOD, PROGRAM, AND FINE PARTICLE ANALYZING SYSTEM

TECHNICAL FIELD

The present technology relates to a fine particle analyzing apparatus and a fine particle analyzing method for processing spectral data, a program for the same apparatus and method, and a fine particle analyzing system including the fine particle analyzing apparatus. More particularly, the present technology relates to a technology for selecting desired spectral data from one or a plurality of spectral data.

BACKGROUND ART

Flow cytometry (flow cytometer) is generally used for analyzing bio-related fine particles such as cells, microbes, and liposome (for example, see Non-Patent Document 1). Flow cytometry is a method which applies laser light (excitation light) having a particular wavelength to fine particles passing through a channel in one line, and detects fluorescence or scattered light emitted from the respective fine particles to analyze the plurality of fine particles one by one. The method of flow cytometry converts light detected by a light detector into an electric signal for quantification, and conducts statistical analysis so as to determine types, sizes, structures or the like of the respective fine particles.

In recent years, multicolor analysis using a plurality of fluorochromes has been widespread in the field of flow cytometer (see Non-Patent Document 1). Each of fluorochromes has a peculiar spectrum. Spectrum information on each fluorochrome is important data showing characteristics of a corresponding fluorochrome.

For example, there is disclosed, in Patent Document 1, a technology which simultaneously detects fluorescence, in a plurality of wavelength areas, emitted from a fine particle, and displays detection results for the respective wavelength areas as spectral display. This technology allows visual recognition of measurement data. On the other hand, there is disclosed, in Patent Document 2, a technology which performs correction calculation of fluorescence intensity values under predetermined limiting conditions at the time of multicolor measurement by using a plurality of light detectors for measuring a fine particle labeled by a plurality of fluorochromes. This technology increases accuracy of fluorescence intensity to be measured.

CITATION LIST

Patent Document

Patent Document 1: JP 2011-232254 A
Patent Document 2: JP 2012-052985 A

Non-Patent Document

Non-Patent Document 1: "Cellular Engineering, supplementary volume, Experimental Protocol Series, Flow Cytometry with Perfect Freedom", second edition, supervised by Hiromitsu NAKAUCHI, Shujunsya Co., Ltd., issued on Aug. 31, 2006

SUMMARY OF THE INVENTION

Problems to be Solved by the Invention

However, when a plurality of types of spectral data is obtained from fluorescence emitted from a fine particle in the conventional flow cytometer, and when discrete spectral data is needed for analysis or other purposes, separation into the discrete spectral data requires complicated work and skillful techniques of a user.

Accordingly, a chief object of the present disclosure is to provide a fine particle analyzing apparatus, a fine particle analyzing method, a program, and a fine particle analyzing system, which are capable of easily separating a plurality of types of spectral data on fluorescence emitted from a fine particle.

Solutions to Problems

A fine particle analyzing apparatus according to the present disclosure includes a data extracting unit that selectively extracts spectral data, which contain predetermined information, from spectral data on fluorescence emitted from a fine particle.

The data extracting unit may selectively extract spectral data indicating the maximum intensity in a wavelength area set beforehand from one or a plurality of types of spectral data indicating intensity of fluorescence emitted from the fine particle for each of a plurality of wavelengths.

According to the fine particle analyzing apparatus of the present disclosure, the data extracting unit is capable of selectively extracting spectral data indicating the maximum fluorescence intensity in the wavelength range set beforehand from the one or the plurality of types of spectral data.

According to the fine particle analyzing apparatus of the present disclosure, the data extracting unit may remove spectral data indicating the maximum intensity lower than a predetermined intensity from the one or the plurality of types of spectral data.

The fine particle analyzing apparatus according to the present disclosure may include a display adjusting unit that allows display of the one or the plurality of spectral data. When the spectral data has been extracted by the data extracting unit, the display adjusting unit may allow selective display of the extracted spectral.

The fine particle analyzing apparatus according to the present disclosure may further include a data obtaining unit that obtains the one or the plurality of spectral data. The display adjusting unit may allow overlapped display of the spectral data obtained by the data obtaining unit. In this case, the display adjusting unit may change display of the spectral data to display of histogram data showing frequency distribution of the fine particle.

The display adjusting unit may vary display colors of the spectral data in accordance with frequency of overlap between the spectral data obtained by the data obtaining unit. The display adjusting unit may allow selective display of the spectral data exhibiting the overlap frequency within a predetermined range.

The fine particle analyzing apparatus according to the present disclosure may further include a user information obtaining unit that obtains user input information containing information on the wavelength range. The data extracting unit may selectively extract the spectral data based on the user input information.

The data extracting unit may include a polynomial approximation processing unit that approximates the spectral data to a polynomial.

The polynomial may be a linear equation.

The fine particle analyzing apparatus according to the present disclosure may further include a data obtaining unit that obtains a plurality of the spectral data from an identical object at predetermined time intervals. The polynomial approximation processing unit may approximate each of the plurality of spectral data obtained by the data obtaining unit at the predetermined time intervals to a polynomial.

The fine particle analyzing apparatus according to the present disclosure may include a detecting unit that detects fluorescence emitted from the fine particle.

The fine particle analyzing apparatus according to the present disclosure may include a sorting unit that sorts the fine particle based on the spectral data extracted by the data extracting unit.

A fine particle analyzing method according to the present disclosure selectively extracts spectral data, which contain predetermined information, from spectral data on fluorescence emitted from a fine particle by use of a data extracting unit.

A program according to the present disclosure is a program under which a fine particle analyzing apparatus performs a function of selectively extracting spectral data, which contain predetermined information, from spectral data on fluorescence emitted from a fine particle.

A fine particle analyzing system according to the present disclosure includes a fine particle analyzing apparatus that includes a data extracting unit which selectively extracts spectral data, which contain predetermined information, from spectral data on fluorescence emitted from a fine particle. The fine particle analyzing apparatus may include a detecting unit that detects fluorescence emitted from the fine particle.

The fine particle analyzing system according to the present disclosure may include a server that includes an information storing unit which stores one or a plurality of spectral data indicating intensity of fluorescence detected by the detecting unit of the fine particle analyzing apparatus for each of a plurality of wavelengths.

According to the present technology, examples of the "fine particle" include a wide variety of particles including a bio-related fine particle such as a cell, a microbe, and liposome, or a synthetic particle such as a latex particle, a gel particle, and a particle for industrial use.

Examples of the bio-related fine particle include a chromosome, liposome, mitochondria, organelle (organelle), and others constituting various types of cells. Examples of the cell include an animal cell (such as a blood cell) and a plant cell. Examples of the microbe include bacteria such as a colon bacillus, a virus such as a tobacco mosaic virus, fungi such as yeast, and others. Examples of the bio-related fine particle may further include nucleic acid, protein, a complex of these, and other bio-related polymers. Examples of the particle for industrial use may include organic or inorganic polymer, metal, and others. Examples of the organic polymer include polystyrene, styrene-divinylbenzene, polymethyl methacrylate, and others. Examples of the inorganic polymer include glass, silica, magnetic material, and others. Examples of the metal include gold colloid, aluminum and others. These fine particles generally have spherical shapes, but may have aspherical shapes. The sizes and mass of these fine particles are not particularly limited.

Effects of the Invention

According to the present disclosure, easy separation of a plurality of types of spectral data on fluorescence emitted from a fine particle is achievable.

MODES FOR CARRYING OUT THE INVENTION

Modes for carrying out the present disclosure are hereinafter described in detail with reference to the accompanying drawings. The present disclosure is not limited to respective embodiments presented herein. The respective embodiments are described in the following order.

1. First Embodiment
(Example of system which selectively extracts spectral data indicating maximum fluorescence intensity in particular wavelength area)
2. Second Embodiment
(Example of system which extracts spectral data after approximation of data to polynomial)
3. Third Embodiment
(Example of system which performs sorting based on separated spectral data)
4. Fourth Embodiment
(Example of system which uses different devices for sorting and detecting fine particle, and for analyzing fine particle)

1. First Embodiment

[Configuration of Fine Particle Analyzing System]

Figure 1:
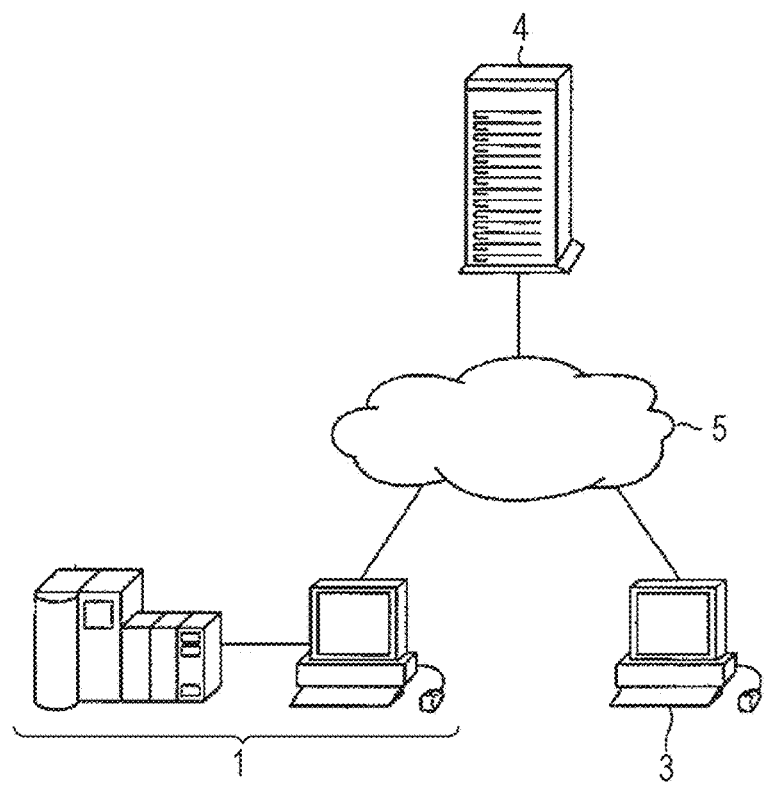
FIG. 1 is a view illustrating an outline of a fine particle analyzing system according to a first embodiment of the present disclosure.

A fine particle analyzing system according to the first embodiment of the present disclosure is initially described. FIG. 1 is a view illustrating an outline of the fine particle analyzing system according to this embodiment. The fine particle analyzing system according to the embodiment is a system which sorts and detects fine particles such as cells, and analyzes the fine particles. As illustrated in FIG. 1, the fine particle analyzing system includes at least a fine particle analyzing apparatus 1. The fine particle analyzing system according to the embodiment may include a server 4. In this case, the fine particle analyzing apparatus 1 and the server 4 may be directly connected, or may be connected with an information processing device 3 provided for data analysis via a network 5 such that each of the fine particle analyzing apparatus 1 and the server 4 can communicate with the information processing device 3.

[Fine Particle Analyzing Apparatus 1]

Figure 2:
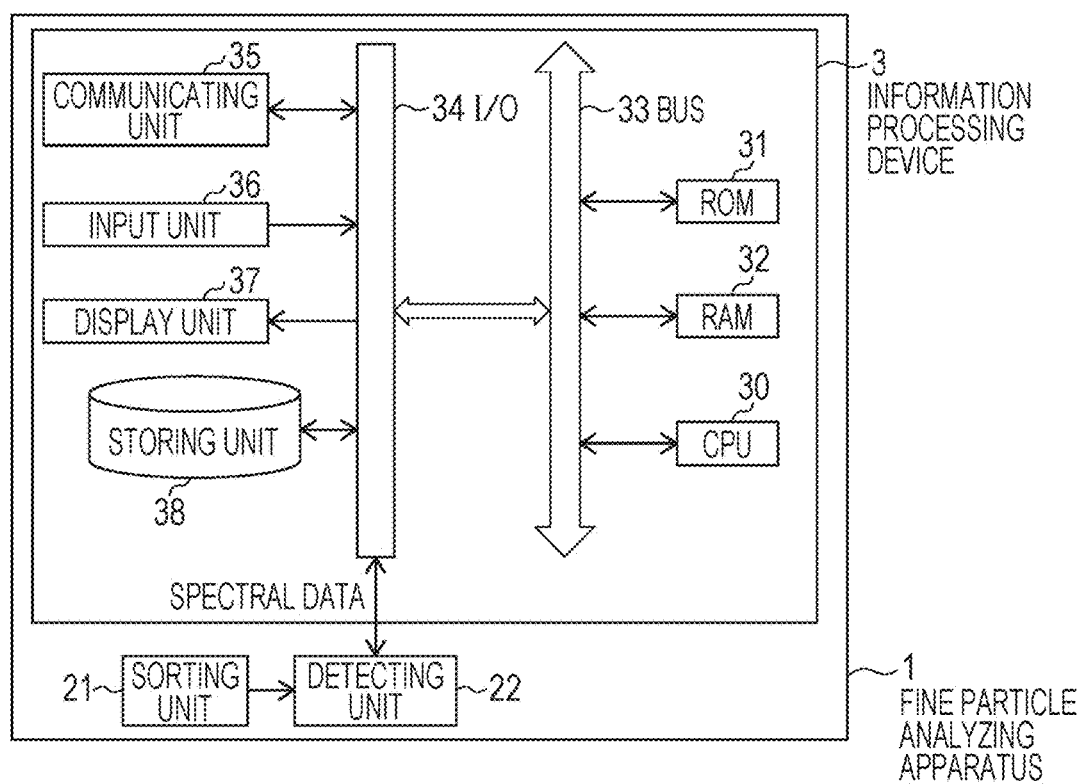
FIG. 2 is a block diagram illustrating a hardware configuration example of a fine particle analyzing apparatus 1.

FIG. 2 is a block diagram illustrating a hardware configuration example of the fine particle analyzing apparatus 1. The fine particle analyzing apparatus 1 selectively extracts spectral data, which contain predetermined information, from spectral data on fluorescence emitted from a fine particle. Particularly, the fine particle analyzing apparatus 1 according to the embodiment selectively extracts spectral data indicating the maximum fluorescence intensity in a wavelength range set beforehand from one or a plurality of spectral data indicating intensity of fluorescence emitted from a fine particle for each of a plurality of wavelengths. The fine particle analyzing apparatus 1 includes a sorting unit 21 for sorting fine particles, a detecting unit 22 for detecting fluorescence of the sorted fine particles, and the information processing device 3 for analyzing fluorescence detected by the detecting unit 22.

(Sorting Unit 21)

The sorting unit 21 may have an arbitrary configuration as far as it is capable of sorting target fine particles. More specifically, the sorting unit 21 controls tracks of droplets generated from a microchip or the like by causing an electric action on the droplets using a deflection plate or the like, and collects the droplets into desired collection containers so as to sort fine particles. The number of the collection containers is not particularly limited. For example, the number of the collection containers may be three or more.

(Detecting Unit 22)

The detecting unit 22 may have an arbitrary configuration as far as it is capable of simultaneously detecting fluorescence, in a plurality of wavelength areas, emitted from an analysis target fine particle. More specifically, the detecting unit 22 may be configured to include sensors disposed for each of wavelength areas to detect the corresponding wavelength areas, or configured to include a detector capable of simultaneously detecting a plurality of lights, such as a photo-multiplier tube (PMT). The number of wavelength areas to be detected by the detecting unit 22, i.e., the number of channels, sensors or the like of the detectors included in the detecting unit 22 is only required to be equivalent to or larger than the number of coloring matters to be used. Colors used in current multicolor analysis are generally 6 to 8 colors, or 10 to 12 colors at most. Accordingly, it is preferable that the number of channels, sensors or the like of the detectors is 12 or larger.

The detecting unit 22 of the fine particle analyzing apparatus 1 according to the embodiment may be configured to include a spectroscope which separates fluorescence emitted from a fine particle into partial lights, so that the respective partial lights separated by the spectroscope can enter a detector such as a PMT. Moreover, the detecting unit 22 may include an objective lens, a condenser lens, a pinhole, a band cut filter, a dichroic mirror, and others, as necessary.

The fine particle analyzing apparatus 1 may include a converting unit (not illustrated) which converts lights in respective wavelength areas detected by the detecting unit 22 into voltage pulses (electric signals). Furthermore, the fine particle analyzing apparatus 1 may include a transmitting unit which transmits data signal indicating spectral data to the information processing device 3, a receiving unit which receives data analyzed by the information processing device 3, and others.

[Information Processing Device 3]

The information processing device 3 analyzes fluorescence of a fine particle detected by the detecting unit 22. As illustrated in FIG. 2, the information processing device 3 includes a CPU (Central Processing Unit) 30, a ROM 31, a RAM 32, a bus 33, an input/output interface unit 34, a communicating unit 35, an input unit 36, a display unit 37, and a storing unit 38. The information processing device 3 may further include some components, not illustrated in FIG. 2, such as a connection port and various types of drives.

(CPU 30)

The CPU 30 functions as an arithmetic processor or a controller, and controls overall operation of respective units provided on the information processing device 3. More specifically, the CPU 30 is capable of performing arithmetic processing as a process executed by a data extracting unit 300 (described later), for example.

(ROM 31 and RAM 32)

The ROM 31 stores data to be used for programs read into the CPU 30 via the bus 33, and data to be used for arithmetic operation, for example. On the other hand, the RAM 32 temporarily or permanently stores programs read into the CPU 30 and various types of parameters variable in accordance with execution of the programs, for example.

(Communicating Unit 35)

The communicating unit 35 functions as communication means which transmits various types of data to the server 4 (described later), and receives data managed by the server 4. The communicating unit 35 is a communication device for connecting to the network 5, and includes a wired or wireless LAN (Local Area Network), or a communication card for WUSB (Wireless USB), for example.

(Input Unit 36)

The input unit 36 is operation means such as a mouse, a keyboard, a touch panel, a button, a switch, and a lever. The input unit 36 may be remote control means (so-called remote controller) capable of transmitting control signals by using infrared light or other radio waves.

(Display Unit 37)

The display unit 37 functions as a display device which displays spectral data obtained by processing of the information processing device 3, and spectral data obtained by processing of the data extracting unit (described later) and others.

Figure 3:
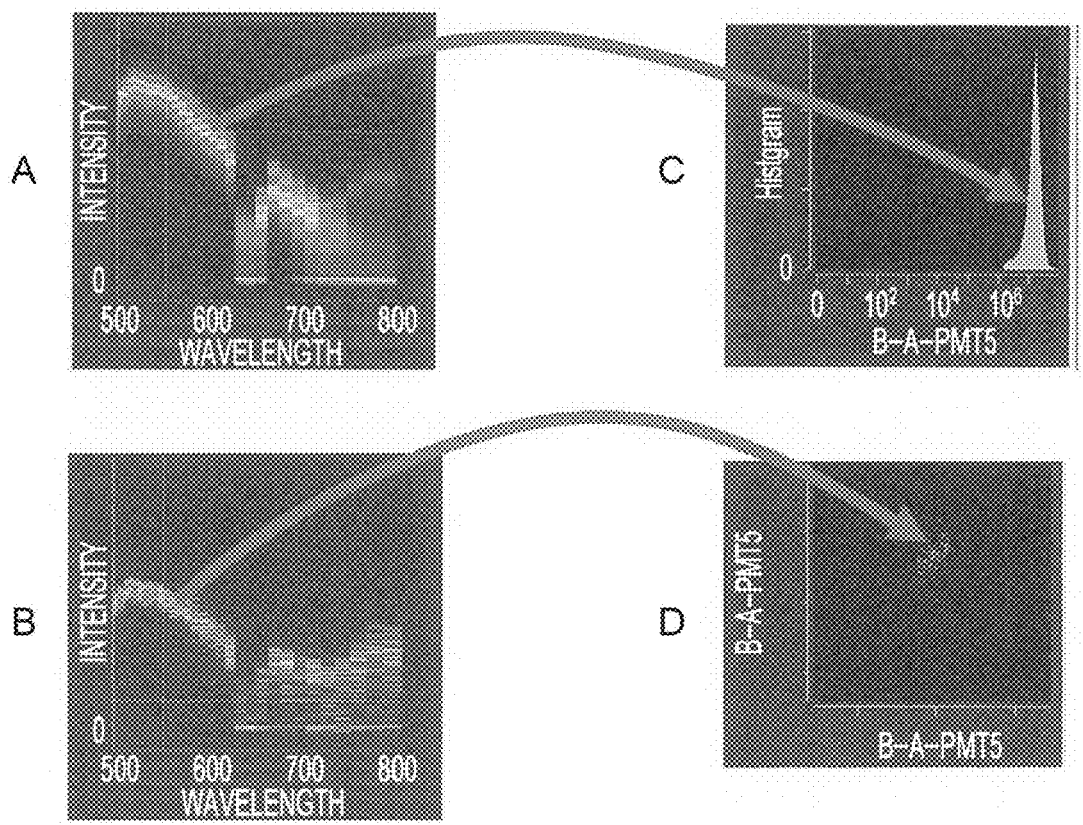
FIG. 3 is a graph as a substitute for a figure, showing data to be displayed on a display unit 37.

FIG. 3 illustrates an example of data displayed on the display unit 37. As illustrated in A and B of FIG. 3, the display unit 37 displays spectral data indicating fluorescence intensity for each channel, showing wavelengths of the detecting unit (channel numbers) on the horizontal axis and fluorescence intensities on the vertical axis.

As illustrated in C of FIG. 3, the display unit 37 may display spectral data shown in A of FIG. 3 as a histogram. Alternatively, as illustrated in D of FIG. 3, the display unit 37 may display spectral data shown in B of FIG. 3 as density plots.

(Storing Unit 38)

The storing unit 38 is a unit for storing various types of data, and includes a magnetic storage device such as a hard disk drive (HDD), a semiconductor storage device, an optical storage device, or a magneto-optical storage device. The storing unit 38 obtains detection results detected by the detecting unit 22 via the input/output interface unit 34, and stores the obtained detection results. The storing unit 38 is also capable of storing spectral data and the like obtained by processing of the data extracting unit 300 (described later) and others.

Figure 4:
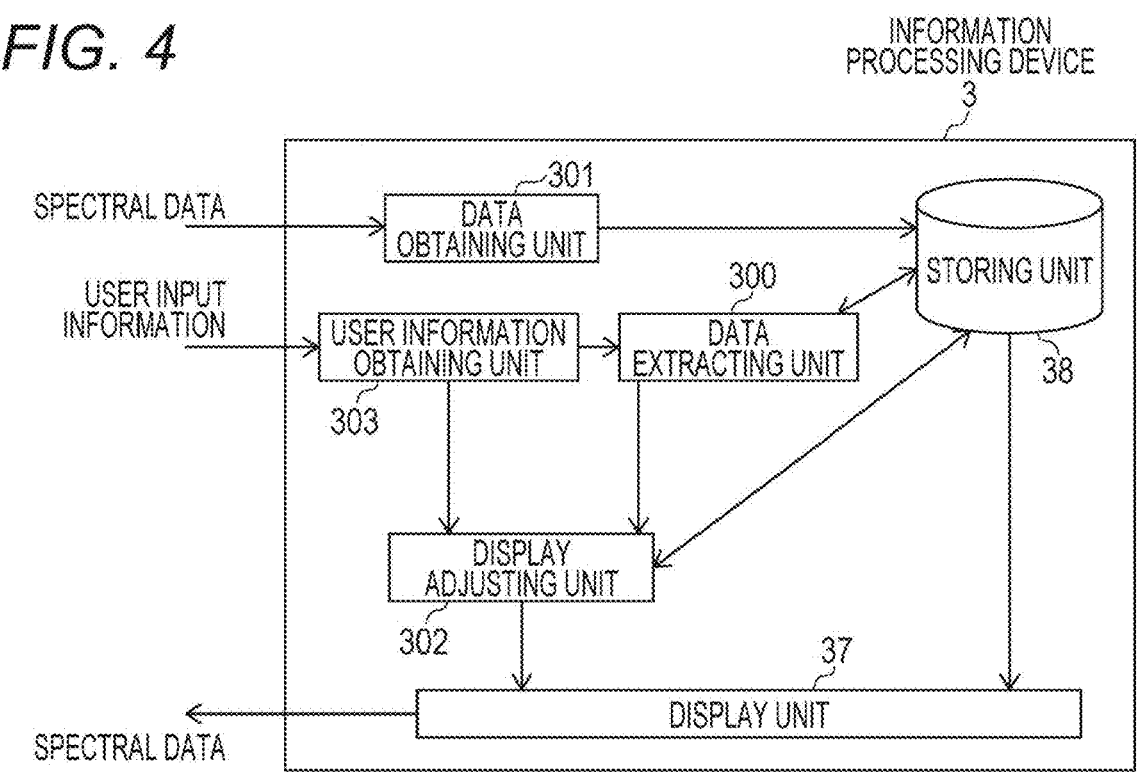
FIG. 4 is a block diagram illustrating a configuration example of an information processing device 3.

Nest, the configuration of the information processing device 3 is further detailed. FIG. 4 is a block diagram illustrating a configuration example of the information processing device 3. The information processing device 3 includes the data extracting unit 300. The information processing device 3 may further include a data obtaining unit 301, a display adjusting unit 302, and a user information obtaining unit 303.

(Data Obtaining Unit 301)

The data obtaining unit 301 obtains information on fluorescence detected by the detecting unit 22 of the fine particle analyzing apparatus 1 as spectral data. A data obtaining method used herein is not particular limited. For example, data on fluorescence intensities of respective channels may be obtained at a time, or data on fluorescence intensities of a plurality of channels may be collectively obtained. The data obtaining unit 301 may obtain spectral data indicating fluorescence intensities of a plurality of channels, i.e., fluorescence intensities of wavelengths in a predetermined area one by one, or may obtain a plurality of types of spectral data at once. The data obtaining unit 301 may obtain a plurality of spectral data on an identical object at predetermined time intervals. In addition to the above function, the data obtaining unit 301 further records obtained spectral data in the storing unit 38.

(User Information Obtaining Unit 303)

The user information obtaining unit 303 obtains user input information. The user input information in this context refers to information obtained as a result of an input by a user to the input unit 36, and information used to display only spectral data desired to be separated by the user from spectral data displayed on the display unit 37. The user input information is displayed as a line cursor on the display unit 37 together with display of spectral data, for example. The user input information contains information on each selection range of a wavelength area and a fluorescence intensity area on a graph showing spectral data.

(Data Extracting Unit 300)

The data extracting unit 300 selectively extracts spectral data, which contain predetermined information, from spectral data stored in the storing unit 38. Particularly, the data extracting unit 300 of the fine particle analyzing system according to the embodiment is capable of selectively extracting spectral data indicating the maximum fluorescence intensity in a predetermined wavelength range from one or a plurality of types of spectral data stored in the storing unit 38. More specifically, the data extracting unit 300 is capable of removing spectral data indicating the maximum fluorescence intensity in wavelength areas out of a wavelength range selected by the user based on the foregoing user input information, and selectively extracts spectral data other than the removed spectral data. The data extracting unit 300 is also capable of removing spectral data indicating the maximum intensity lower than a predetermined fluorescence intensity from one or a plurality of types of spectral data, based on the user input information.

(Display Adjusting Unit 302)

The display adjusting unit 302 allows display of spectral data on the display unit 37. After extraction of spectral data by the data extracting unit 300, the display adjusting unit 302 allows selective display of the extracted spectral data.

The display adjusting unit 302 is also capable of displaying a plurality of spectral data, being integrated for an identical object, overlapped with each other on the display unit 37. In this case, the display adjusting unit 302 may vary display colors in accordance with frequency of overlap between spectral data. For example, information on frequency becomes more visible when data overlapping with other data with high frequency and data overlapping with other data with low frequency are displayed in red and blue, respectively. The display adjusting unit 302 is also capable of selectively displaying only spectral data overlapping with other data with frequency within a predetermined range. The display adjusting unit 302 is capable of changing spectral data displayed on the display unit 37 into histogram data indicating frequency distribution of fine particles. More specifically, the histogram may be a histogram indicating one parameter (such as the number of cells), or a histogram indicating two or more parameters.

[Server 4]

The server 4 illustrated in FIG. 1 includes an information storing unit which manages various types of data uploaded from the information processing device 3. The server 4 outputs the data stored in the information storing unit to the information processing device 3 in response to a request. The server 4 generates GUI (Graphical User Interface) for the user operating the display unit 37 concerning images viewable on the information processing device 3.

[Network 5]

The network 5 is a communication network connecting the information processing device 3 and the server 4 in a bidirectional communicative manner. The network 5 includes a public network such as the Internet, a telephone network, a satellite network, and a broadcast network, or a dedicated network such as a WAN (Wide Area Network), a LAN (Local Area Network), an IP-VPN (Internet Protocol-Virtual Private Network), an Ethernet (registered trademark), and a wireless LAN. The network 5 may be either a wired type or a wireless type. The network 5 may be a communication network provided exclusively for the fine particle analyzing system according to the embodiment.

[Operation]

Figure 5:
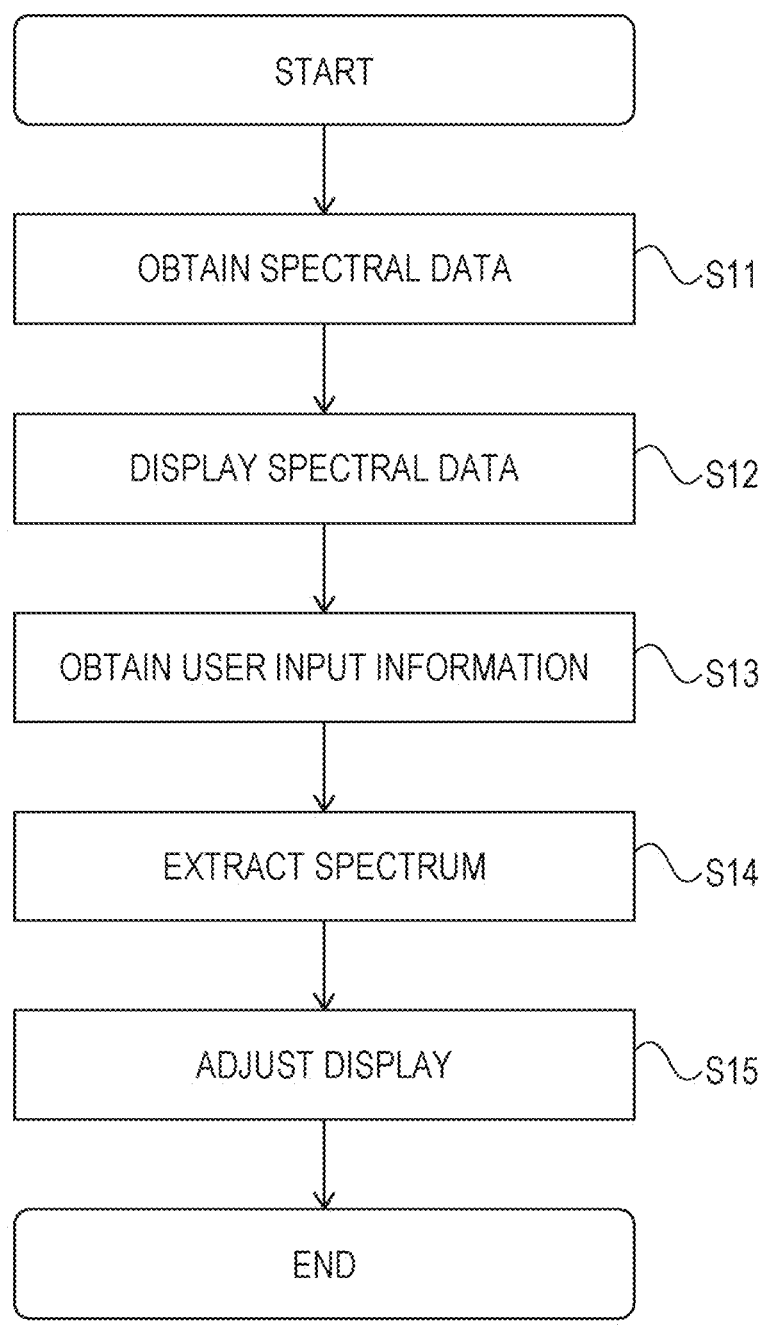
FIG. 5 is a flowchart showing an outline of a spectral data display method executed by the information processing device 3.

An example operation of the fine particle analyzing system according to the embodiment is hereinafter described. FIG. 5 is a flowchart showing an outline of overall operation of the fine particle analyzing system according to the embodiment.

According to the fine particle analyzing system of the embodiment, the data obtaining unit 301 obtains, via the input/output interface unit 34, spectral data indicating fluorescence intensity for each of a plurality of wavelengths detected by the detecting unit 22 (step S11). In this case, the data obtaining unit 301 is capable of obtaining a plurality of types of spectral data on a fine particle corresponding to a measurement object.

Figure 6:
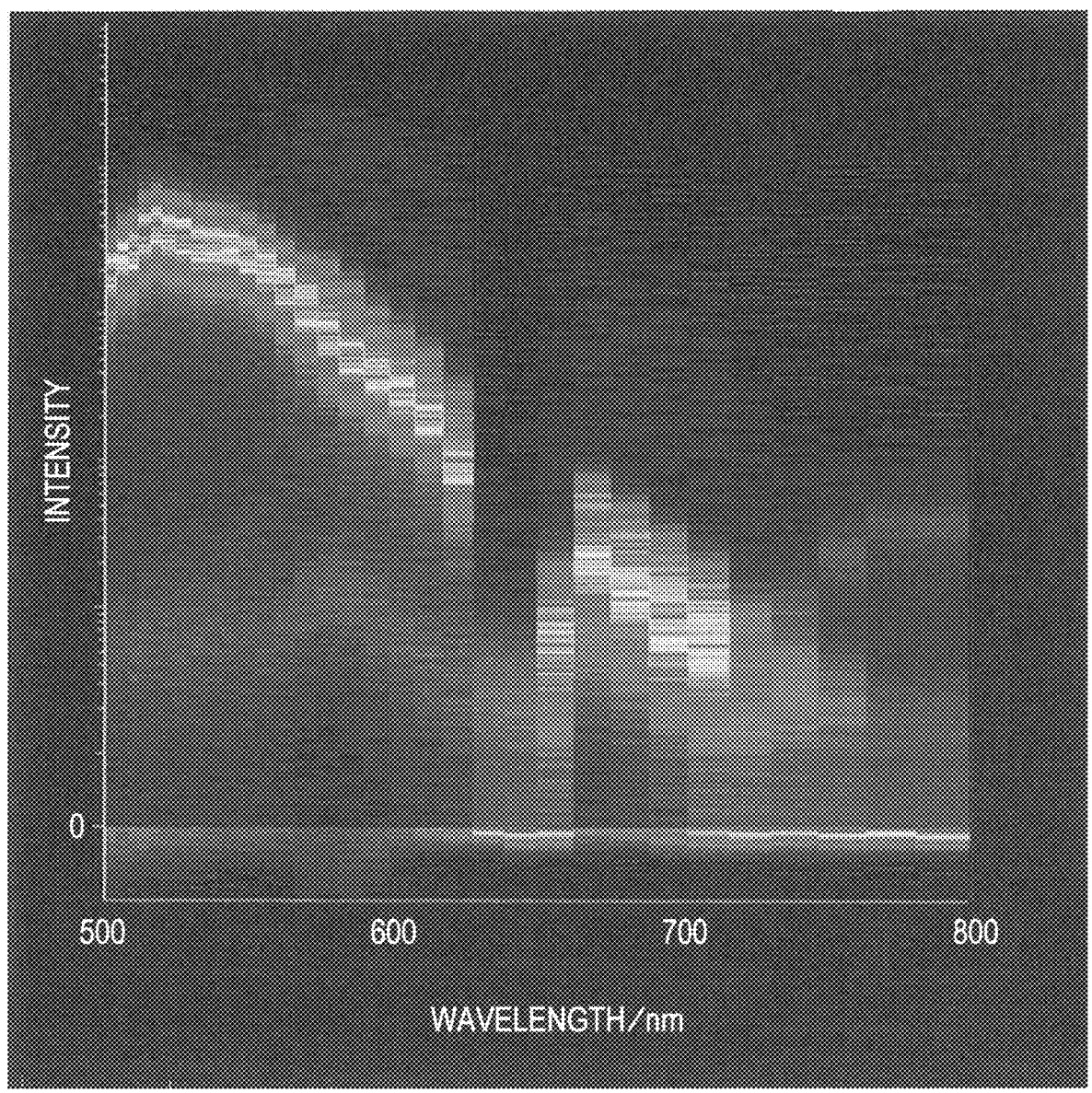
FIG. 6 is a graph as a substitute for a figure, showing an example of spectral data to be displayed on the display unit 37.

Then, the display adjusting unit 302 allows display of spectral data on the display unit 37 (step S12). FIG. 6 is a view illustrating an example of spectral data displayed on the display unit 37. As illustrated in FIG. 6, a plurality of spectral data in an integrated state are displayed on the display unit 37, with wavelengths shown on the horizontal axis, and fluorescence intensities shown on the vertical axis, for example. Simultaneous display of a plurality of types of spectral data is allowed on the display unit 37. In this case, the display adjusting unit 302 may allow the display unit 37 to display respective data in different colors in accordance with frequency of overlap between the data. Ranges of spectral data to be displayed on the vertical axis and horizontal axis of the display unit 37 may be arbitrarily determined in accordance with user input information designating ranges desired by the user.

Then, the user information obtaining unit 303 obtains the user input information (step S13 in FIG. 5). More specifically, the user is allowed to select and determine a desired wavelength area while viewing spectral data displayed on the display unit 37 in step S12. The user input information is created in accordance with predetermined operation by the user through the input unit 36.

Figure 7:
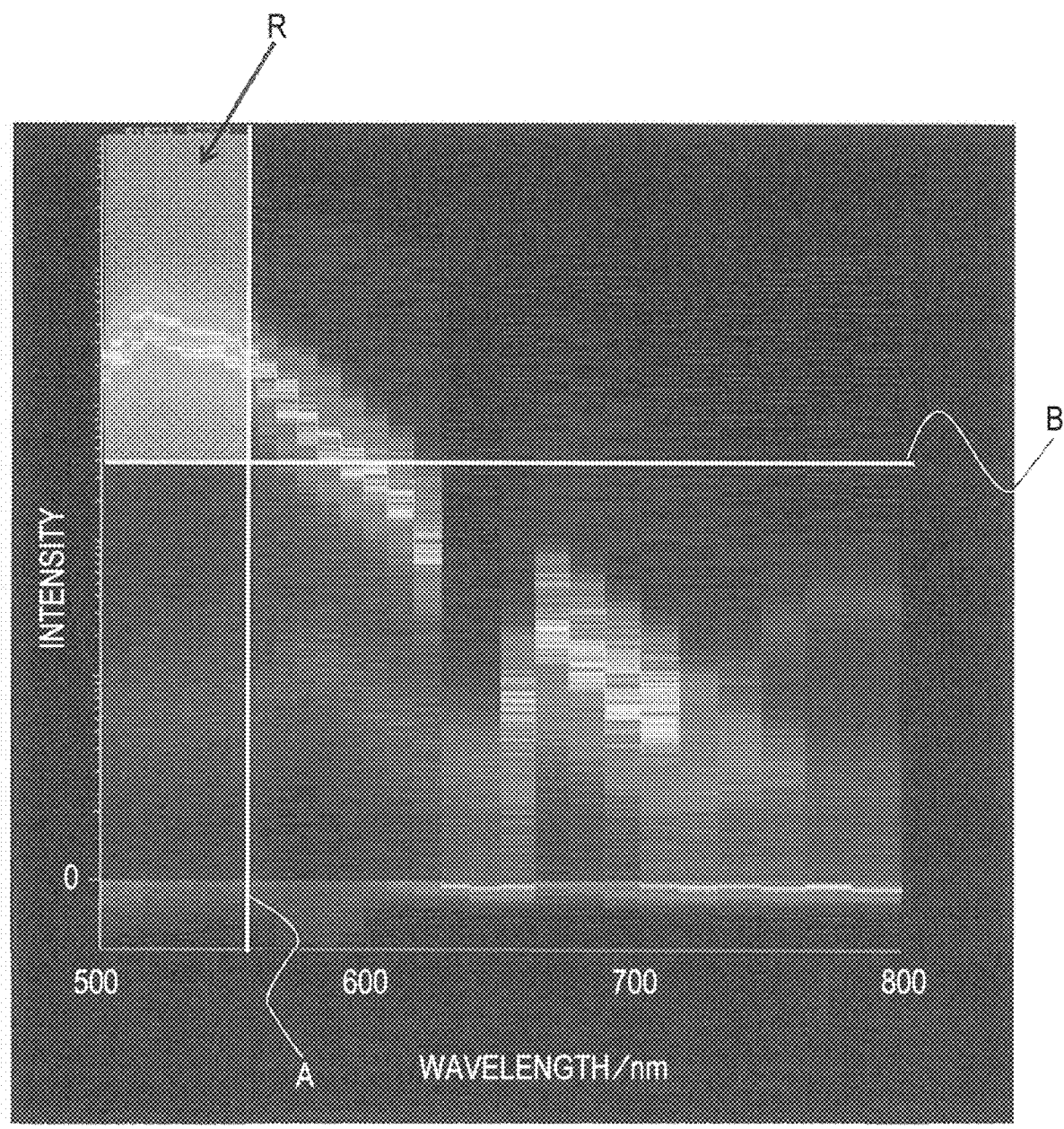
FIG. 7 is a graph as a substitute for a figure, showing an example of spectral data after selection of a predetermined wavelength area.

FIG. 7 is a view illustrating an example of spectral data after selection of a desired wavelength area. As illustrated in FIG. 7, the user is allowed to shift a line cursor A shown on the spectral data and adjustable in the horizontal axis direction. In this case, an area on the short wavelength side with respect to a wavelength indicated by the line cursor A in the wavelength area displayed on the display unit 37 is determined as a selected wavelength area. The data extracting unit 300 is capable of removing spectral data indicating the maximum fluorescence intensity in an area out of this wavelength area. In addition, by shifting a line cursor B adjustable in the vertical axis direction, the data extracting unit 300 is capable of removing spectral data indicating the maximum intensity lower than an intensity indicated by the line cursor B in the wavelength area displayed on the display unit 37.

Figure 8:
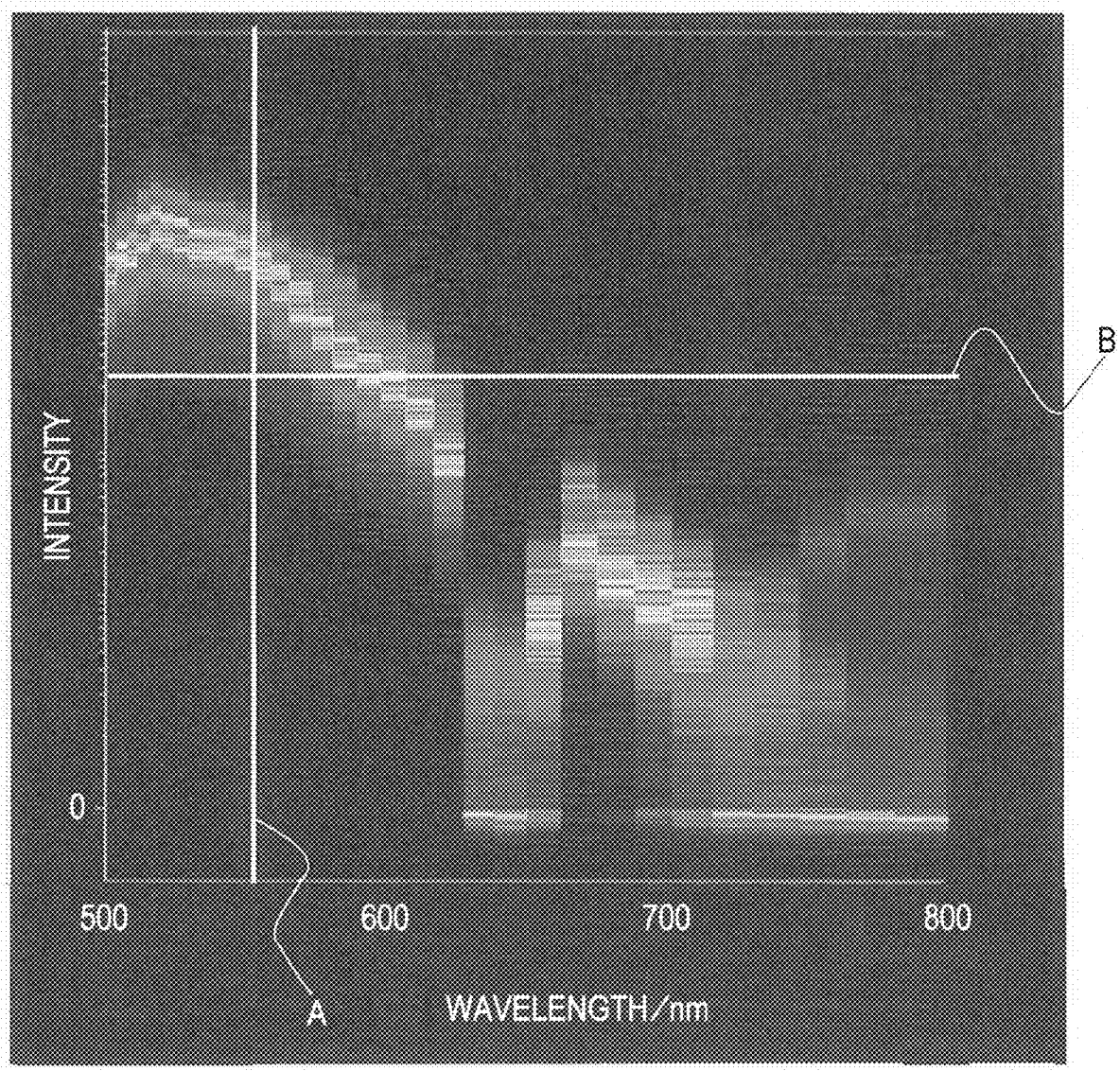
FIG. 8 is a graph as a substitute for a figure, showing an example after extraction of spectral data.

FIG. 8 is a view illustrating an example after extraction of desired spectral data. The data extracting unit 300 is capable of selectively extracting only spectral data indicating the maximum fluorescence intensity in an area R shown in FIG. 7 based on the user input information in accordance with the foregoing operation by the user with reference to FIG. 7 (step S14 in FIG. 5). In this case, the storing unit 38 is capable of storing the extracted spectral data.

Figure 9:
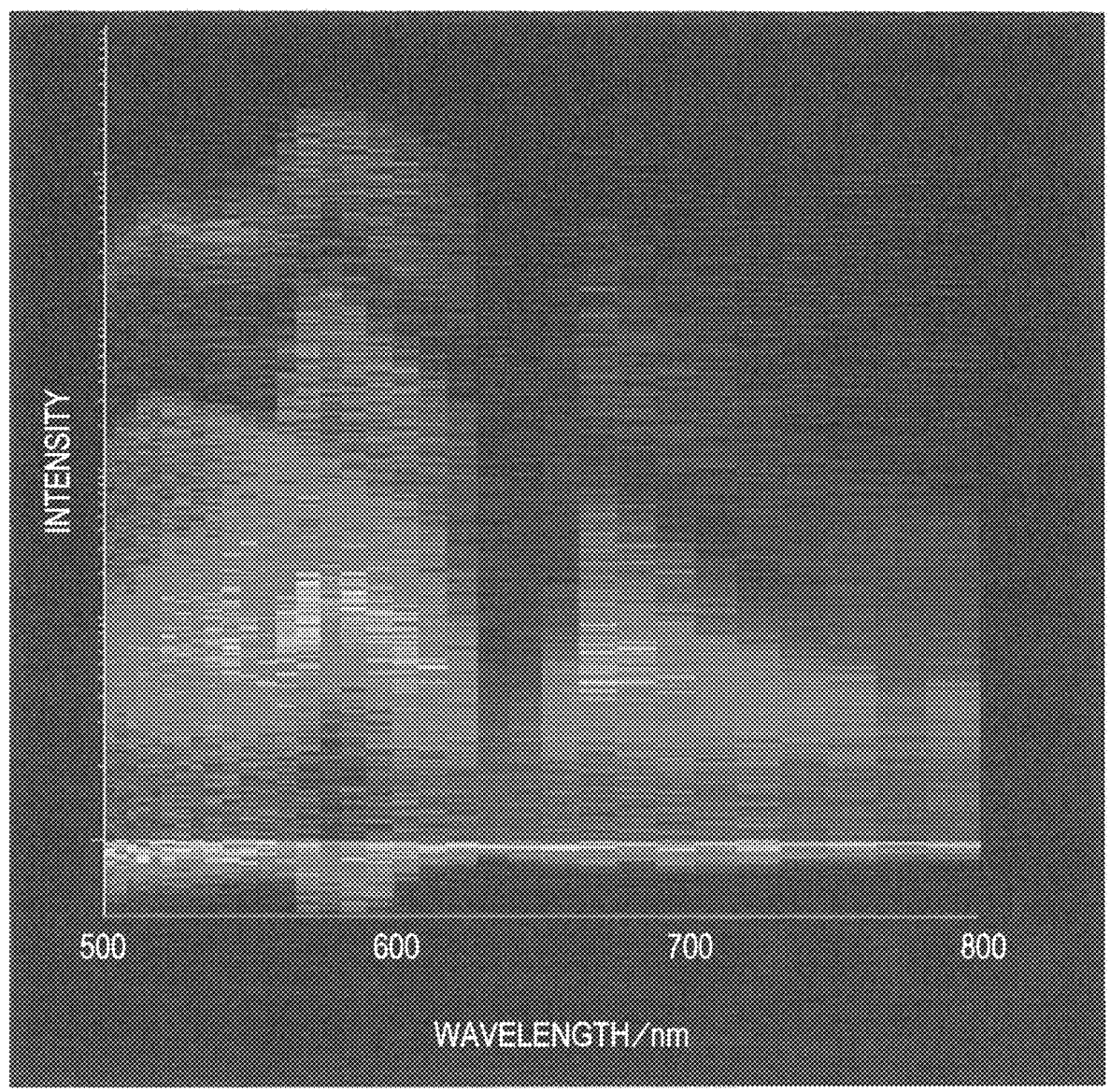
FIG. 9 is a graph as a substitute for a figure, showing spectral data after subtraction of the spectral data shown in FIG. 8 from the spectral data shown in FIG. 7.

Then, the display adjusting unit 302 adjusts a spectral data display method (step S15). Hereinafter, discussed with reference to FIGS. 8 to 17 is an example of a method of extracting spectral data executed by the data extracting unit 300, and a spectral data display method executed by the display adjusting unit 302. Initially, the display adjusting unit 302 subtracts the foregoing spectral data shown in FIG. 8 from the spectral data shown in FIG. 7 based on the user input information. FIG. 9 is a view illustrating spectra data obtained after subtraction of the spectral data shown in FIG. 8 from the spectral data shown in FIG. 7. The display adjusting unit 302 is capable of subtracting the spectral data shown in FIG. 8 from the spectral data shown in FIG. 7 based on the user input information. This processing allows the user to confirm the presence of spectral data with relatively low overlap frequency in the plurality of types of spectral data displayed on the display unit 37, for example.

Figure 10:
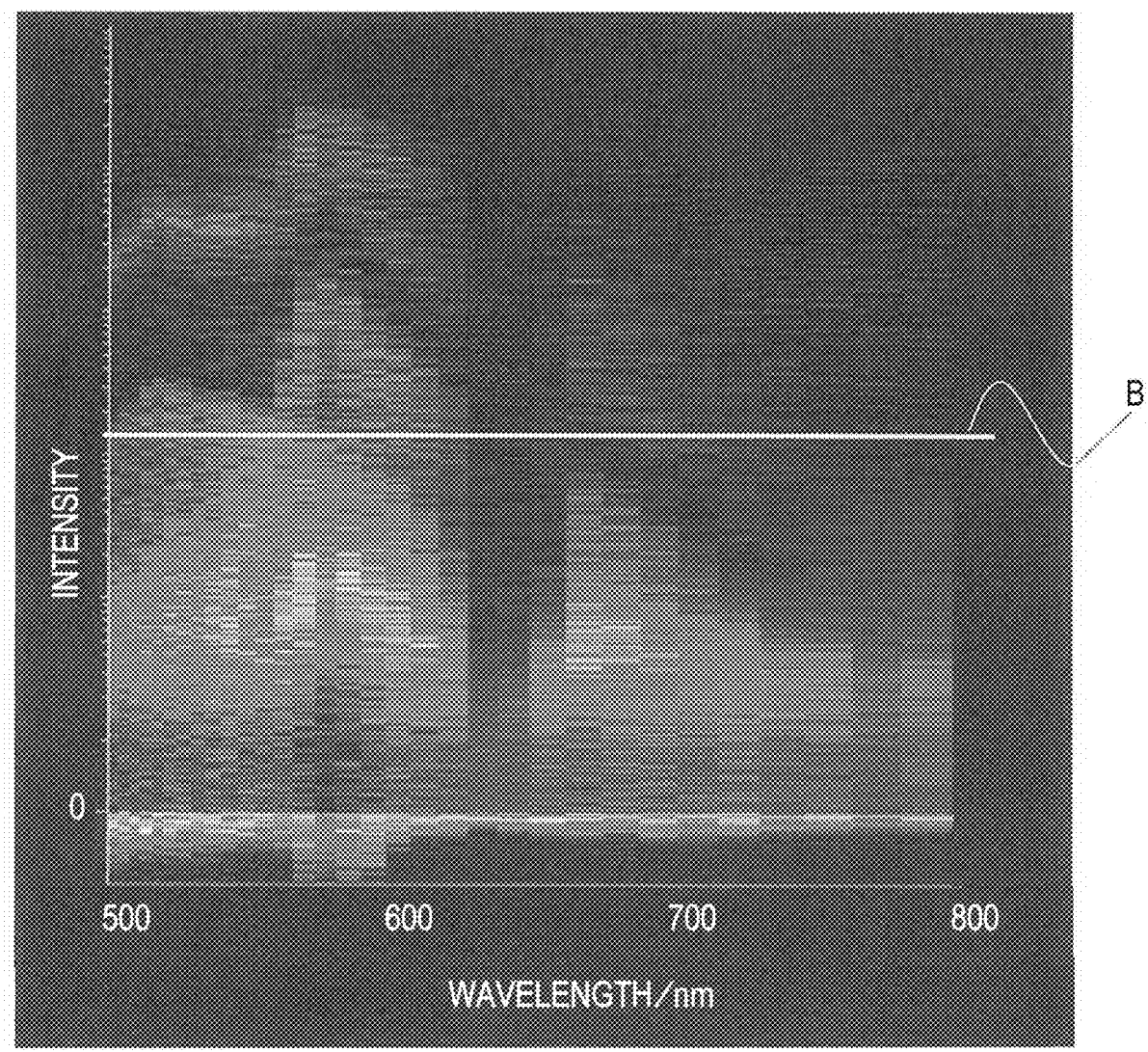
FIG. 10 is a graph as a substitute for a figure, showing a state in which a threshold is established on the spectral data shown in FIG. 9 in the vertical axis direction (intensity direction) by using a line cursor B.
Figure 11:
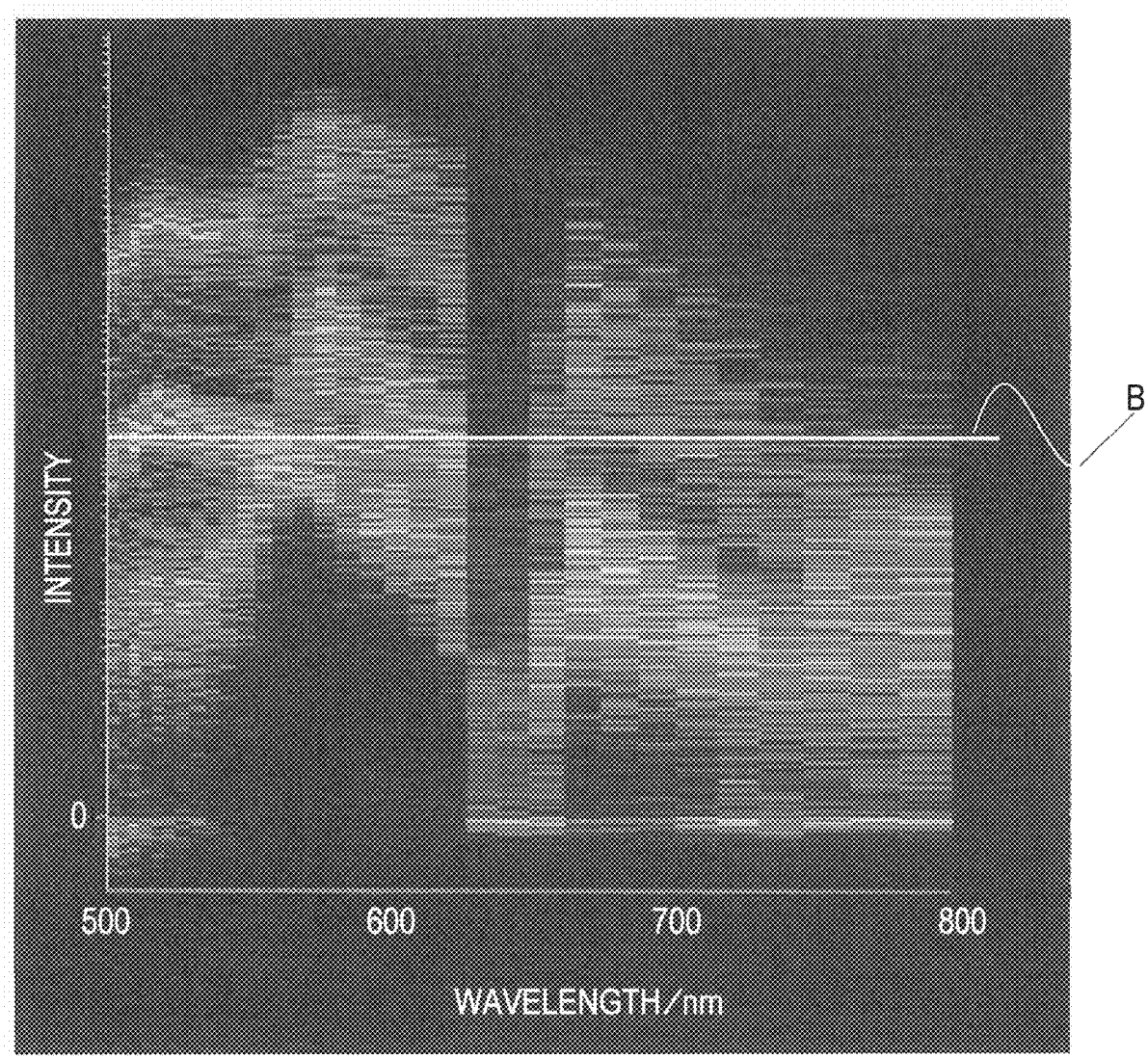
FIG. 11 is a graph as a substitute for a figure, showing spectral data after removal of spectral data indicating the maximum fluorescence intensity lower than an intensity indicated by the line cursor B from the spectral data shown in FIG. 10.

FIG. 10 is a view illustrating a state in which a threshold is established on the spectral data shown in FIG. 9 in the vertical axis direction (intensity direction) using the line cursor B. As illustrated in FIG. 10, a threshold is established based on the user input information. This method allows the data extracting unit 300 to remove spectra data indicating the maximum fluorescence intensity lower than an intensity indicated by the line cursor B. FIG. 11 is a view illustrating spectral data after removal of the spectral data indicating the maximum intensity lower than the intensity indicated by the line cursor B from the spectral data shown in FIG. 10. As illustrated in FIG. 11, this method allows the user to clearly recognize spectral data not visually recognizable from the plurality of spectral data shown in FIG. 7.

Figure 12:
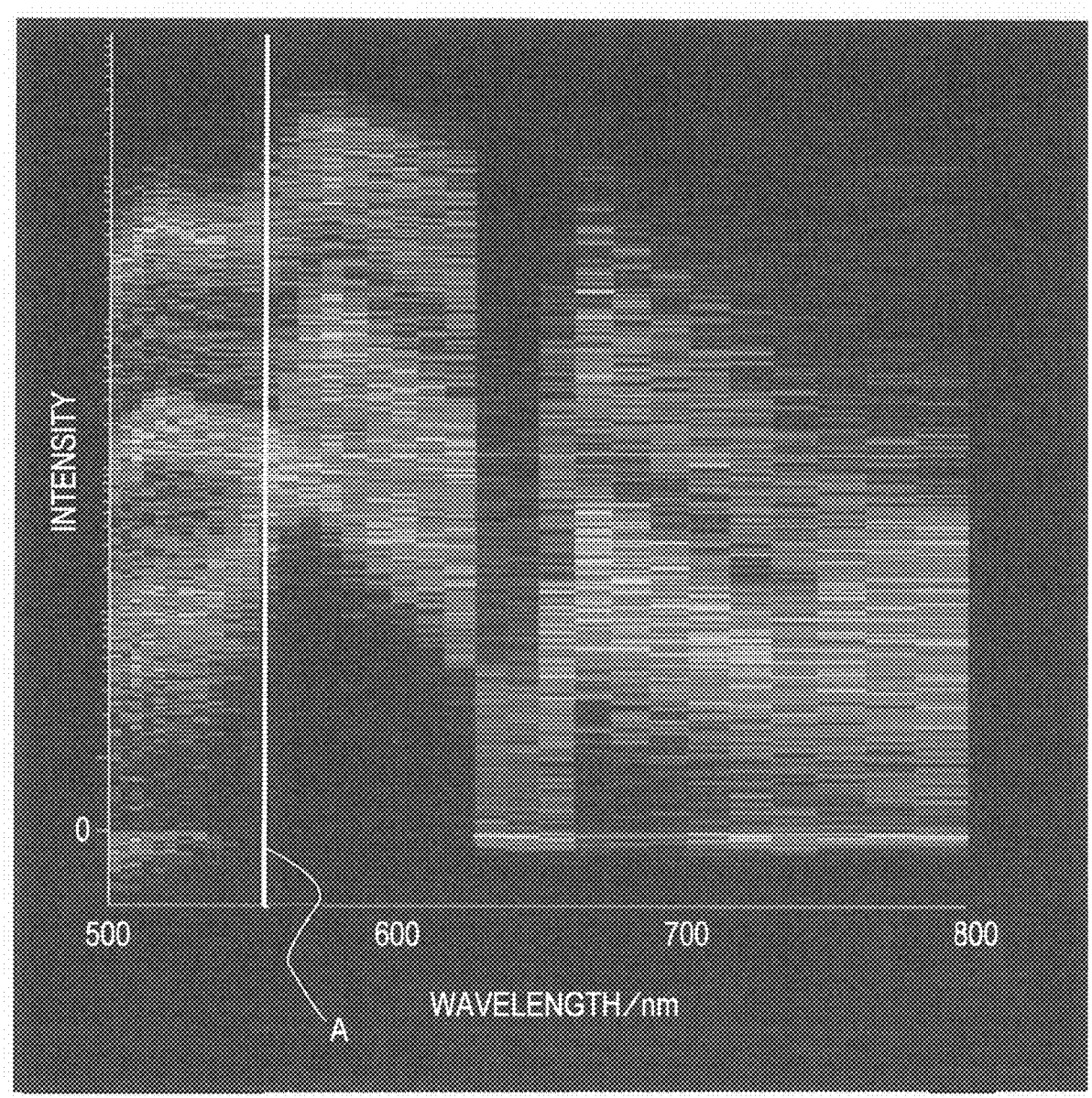
FIG. 12 is a graph as a substitute for a figure, showing a state in which a threshold is established on the spectral data shown in FIG. 11 in the horizontal axis direction (wavelength direction) by using a line cursor A.
Figure 13:
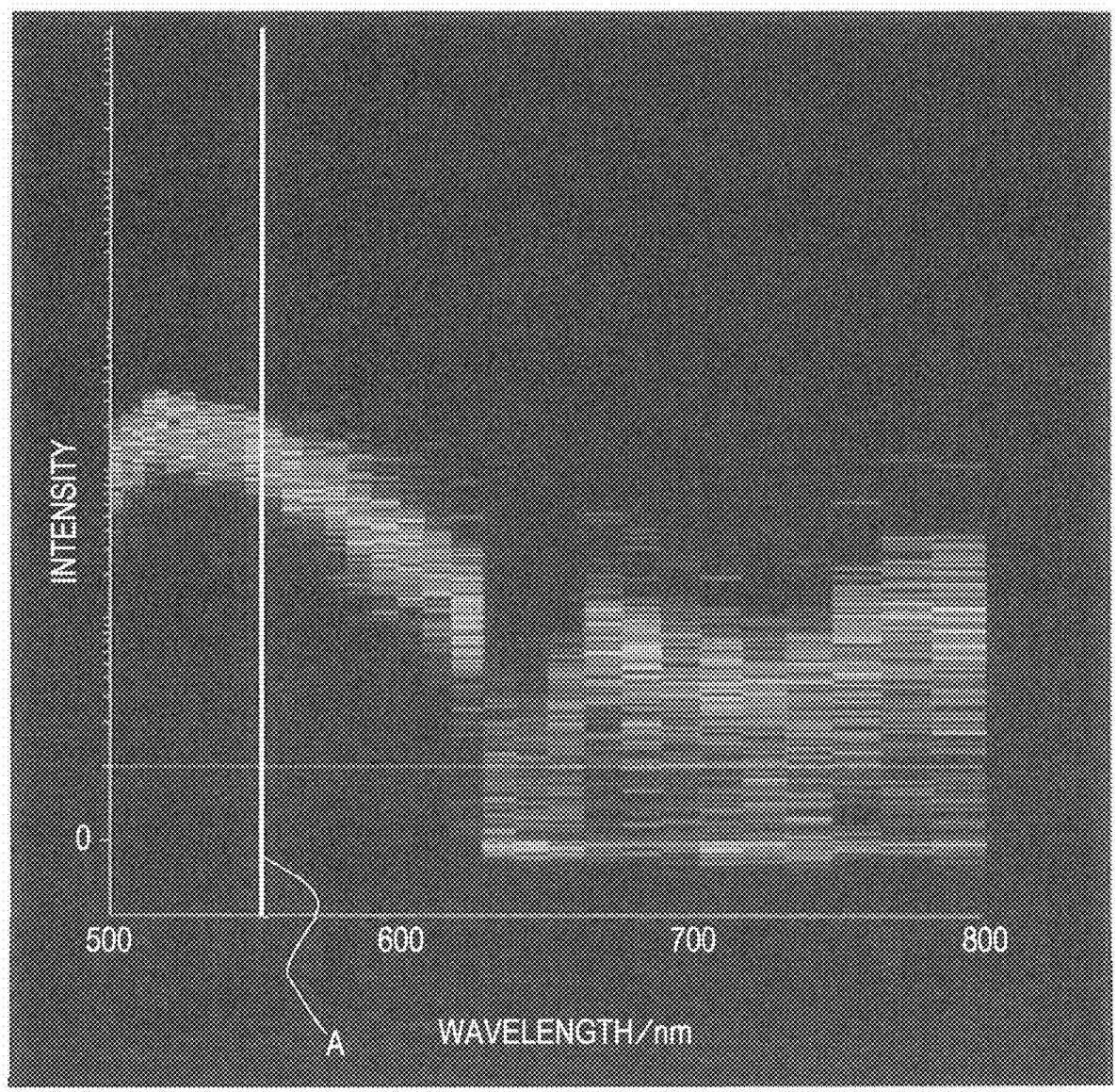
FIG. 13 is a graph as a substitute for a figure, showing only spectral data extracted by a data extracting unit 300 from the spectral data shown in FIG. 12.

FIG. 12 is a view illustrating a state in which a threshold is established on the spectral data shown in FIG. 11 in the horizontal axis direction (wavelength direction) using the line cursor A. As illustrated in FIG. 12, the threshold is established based on the user input information. This method allows the data extracting unit 300 to selectively extract spectral data indicating the maximum fluorescence intensity on the short wavelength side with respect to the wavelength indicated by the line cursor A, in the wavelength area displayed on the display unit 37. FIG. 13 is a view illustrating only spectral data extracted by the data extracting unit 300 from the spectral data shown in FIG. 12. As illustrated in FIG. 13, the storing unit 38 is capable of storing the extracted spectral data similarly to the spectral data shown in FIG. 8.

Figure 14:
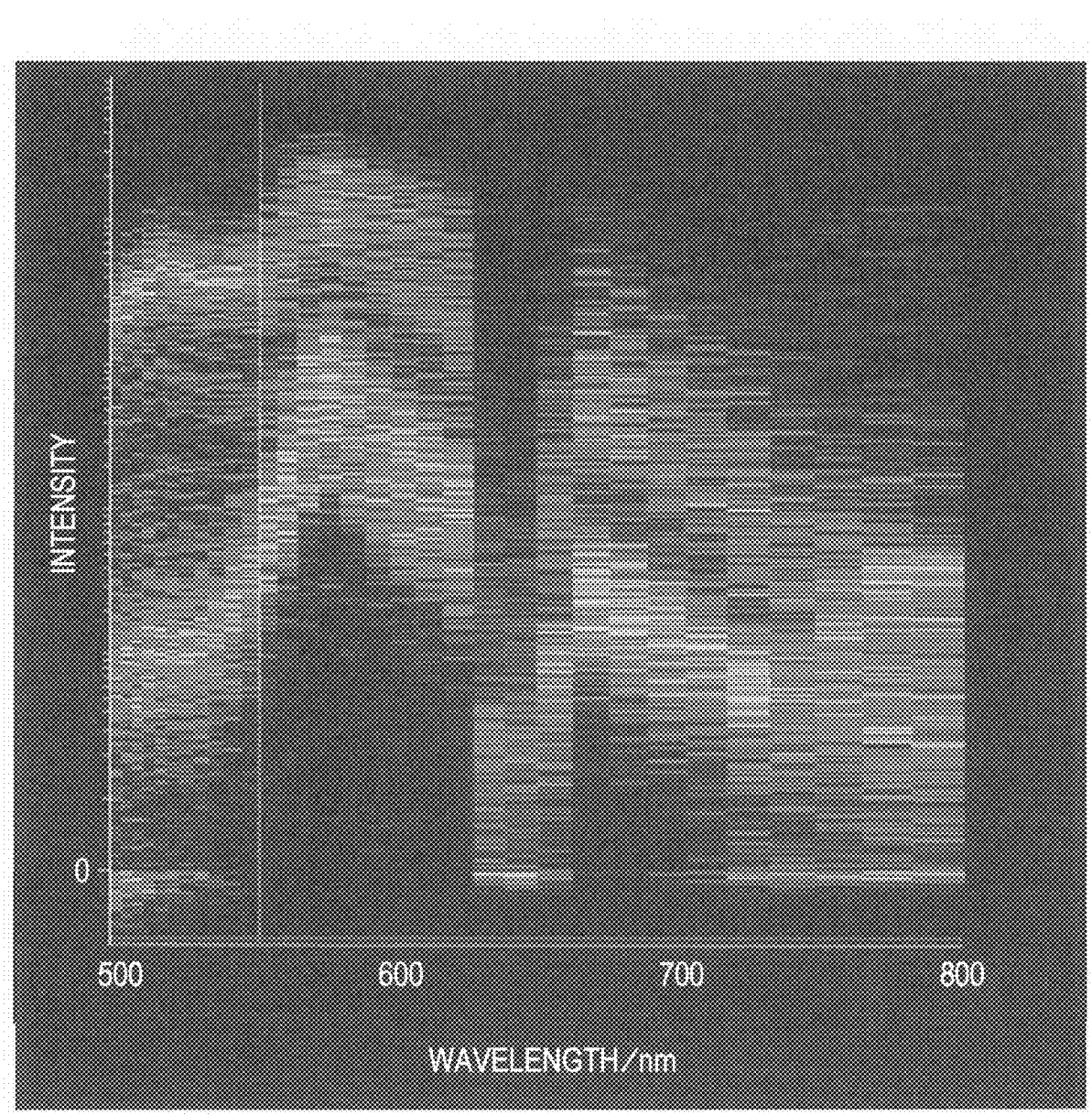
FIG. 14 is a graph as a substitute for a figure, showing a state after subtraction of the spectral data shown in FIG. 13 from the spectral data shown in FIG. 12.

FIG. 14 is a view illustrating a state after subtraction of the spectral data shown in FIG. 13 from the spectral data shown in FIG. 12. The display adjusting unit 302 is capable of subtracting the spectral data shown in FIG. 13 from the spectral data shown in FIG. 12 based on the user input information. After this process, the display unit 37 displays only two types of spectra.

Figure 15:
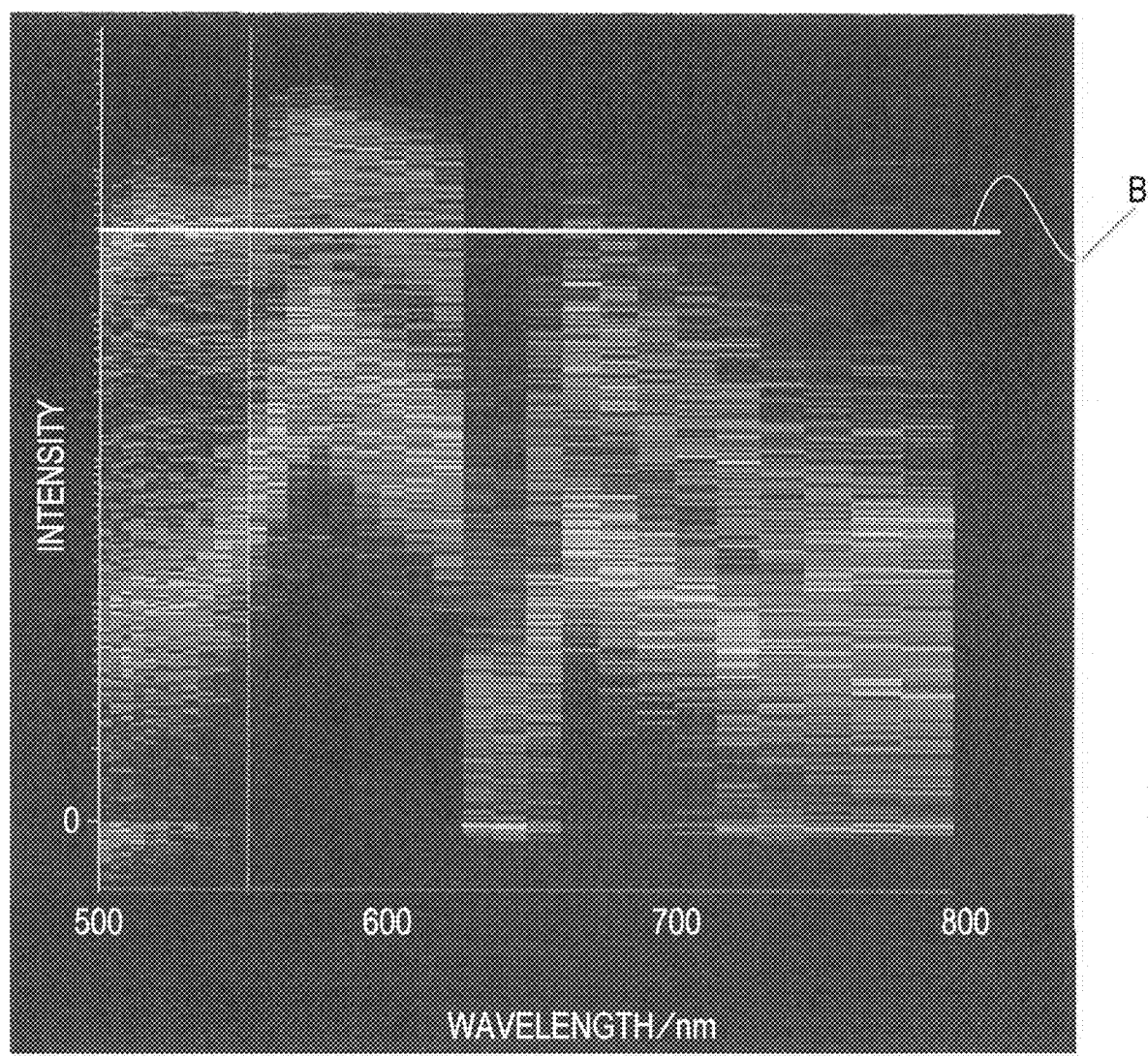
FIG. 15 is a graph as a substitute for a figure, showing a state in which a threshold is established on the spectral data shown in FIG. 14 in the vertical axis direction (intensity direction).
Figure 16:
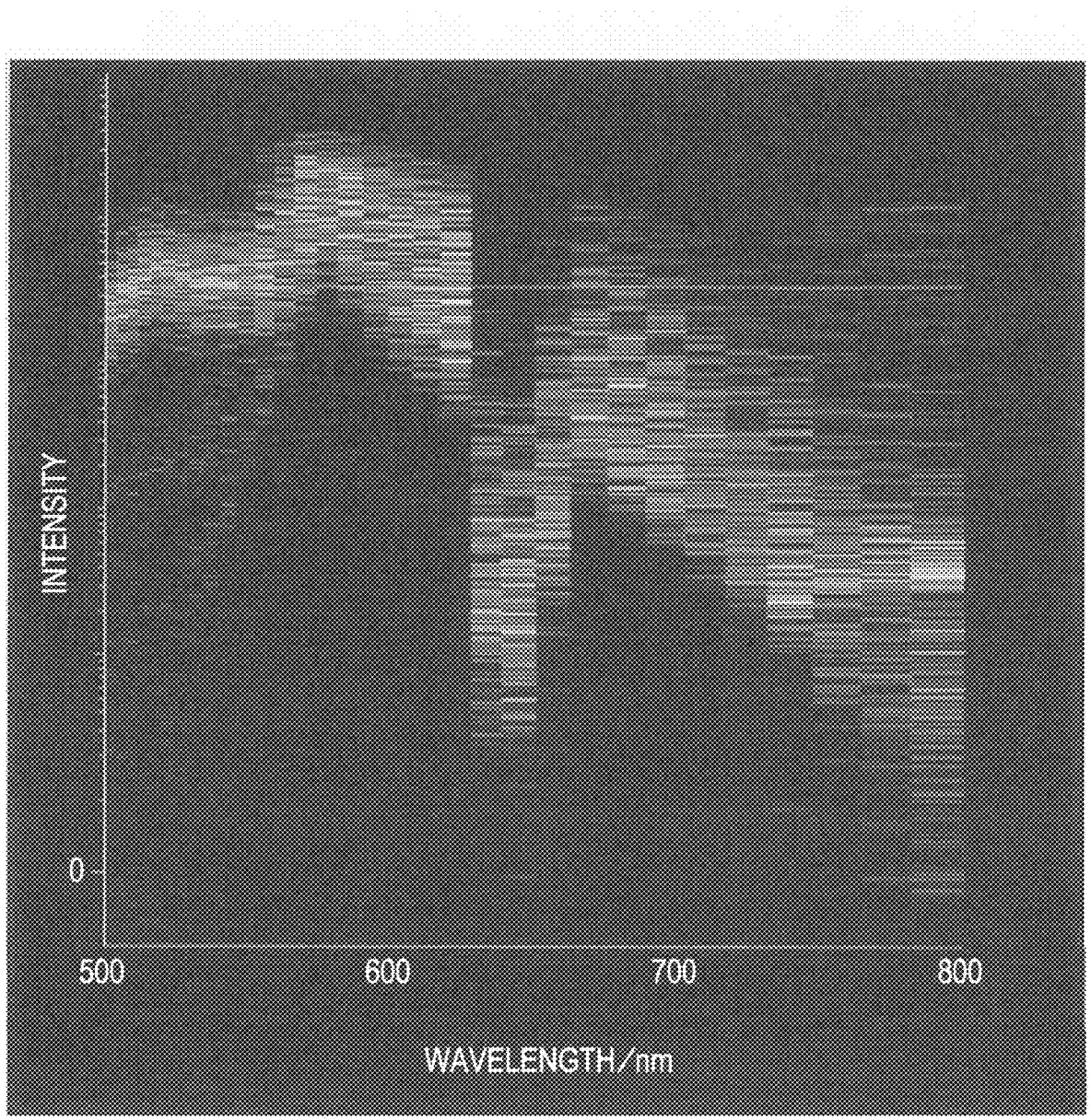
FIG. 16 is a graph as a substitute for a figure, showing spectral data after removal of spectral data indicating the maximum fluorescence intensity lower than an intensity indicated by the line cursor B from the spectral data shown in FIG. 15.

FIG. 15 is a view illustrating a state in which a threshold is established on the spectral data shown in FIG. 14 in the vertical axis direction (intensity direction). As illustrated in FIG. 15, the threshold is established based on the user input information. This method allows the data extracting unit 300 to remove spectra data indicating the maximum fluorescence intensity lower than an intensity indicated by the line cursor B. FIG. 16 is a view illustrating spectral data after removal of spectral data indicating the maximum fluorescence intensity lower than the intensity indicated by the line cursor B from the spectral data shown in FIG. 15. As illustrated in FIG. 16, this method allows the user to visually recognize only one type of spectral data.

Figure 17:
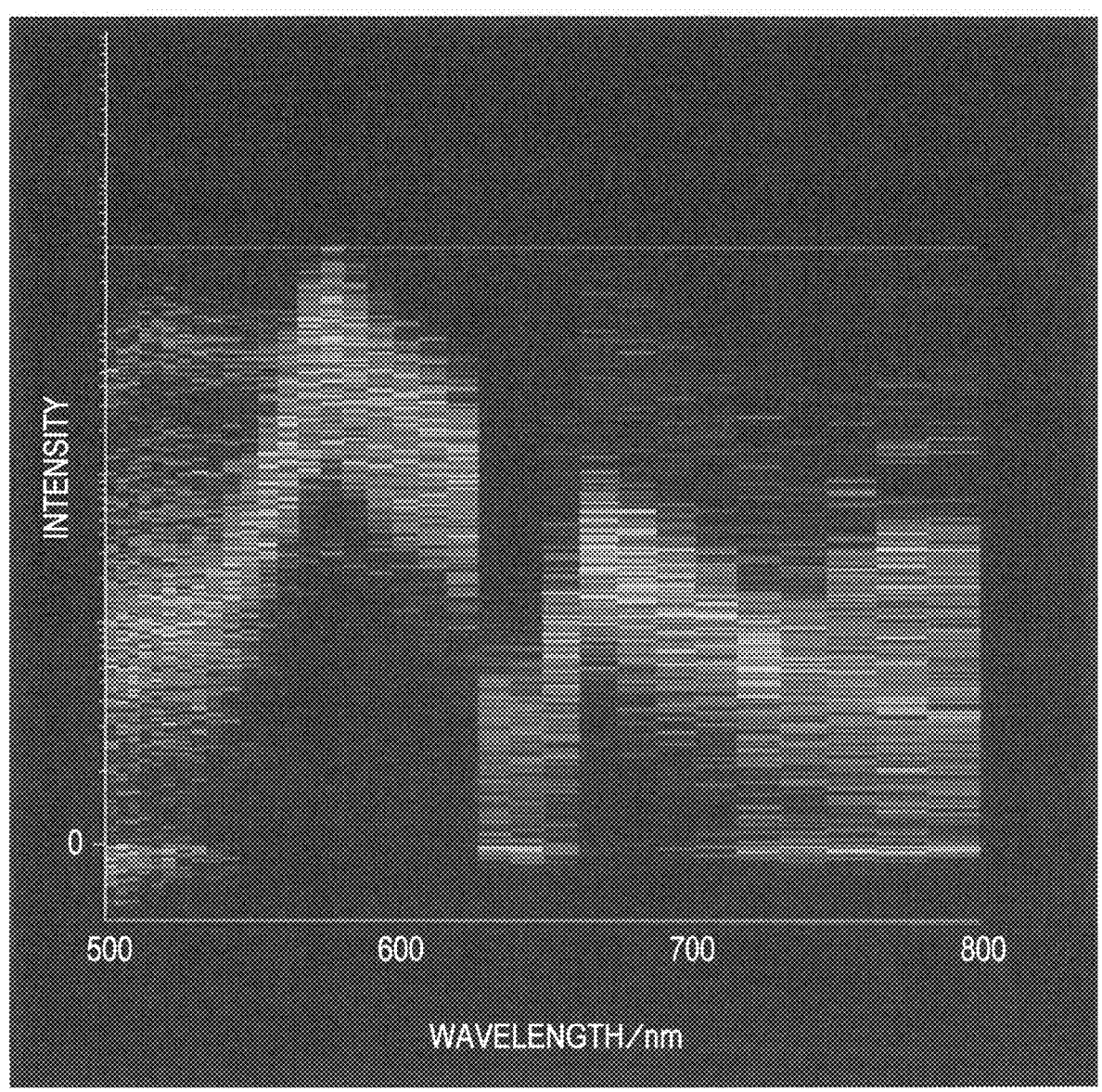
FIG. 17 is a graph as a substitute for a figure, showing a state after subtraction of the spectral data shown in FIG. 16 from the spectral data shown in FIG. 15.

FIG. 17 is a view illustrating a state after subtraction of the spectral data shown in FIG. 16 from the spectral data shown in FIG. 15. The display adjusting unit 302 is capable of extracting the spectral data shown in FIG. 16 from the spectral data shown in FIG. 15 based on the user input information. Through this process, spectral data contained in the two types of spectral data shown in FIG. 14 and not corresponding to the data shown in FIG. 16 can be obtained. In this case, the storing unit 38 is capable of storing the extracted spectral data similarly to the spectral data shown in FIG. 8.

In an arbitrary stage of the foregoing steps, the display adjusting unit 302 is also capable of varying display colors in accordance with frequency of overlap between spectral data, or selectively displaying only spectral data with overlap frequency within a predetermined range.

Figure 18:
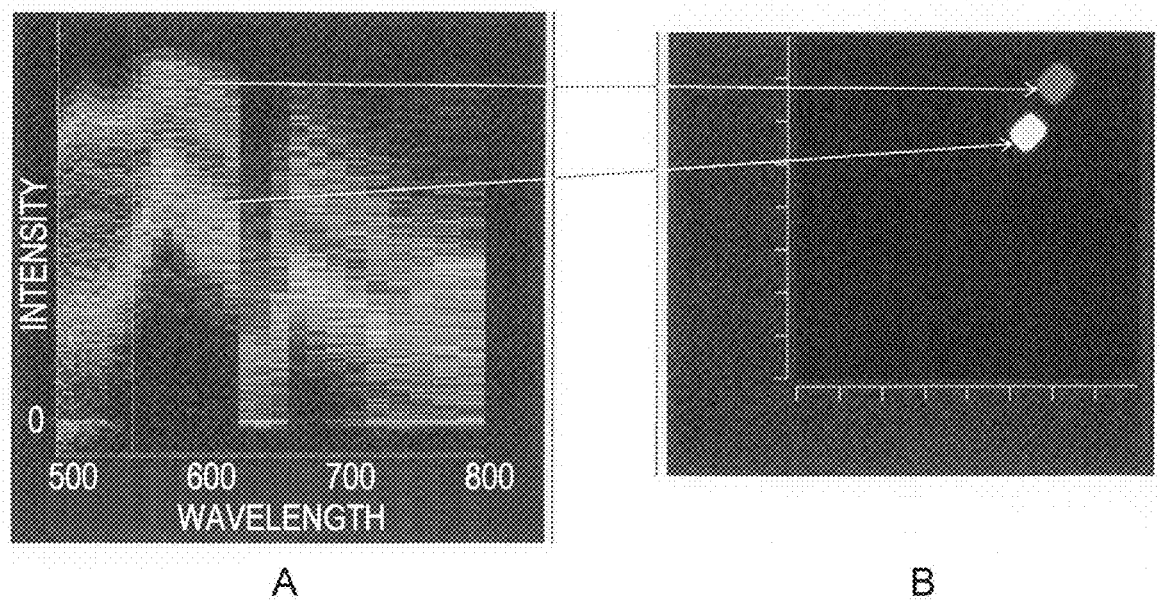
FIG. 18 is a graph as a substitute for a figure, showing a state in which display of spectral data has been changed to display of density data.

The display adjusting unit 302 is also capable of changing spectral data display to density data display based on the user input information. FIG. 18 is a view illustrating a concept of a state in which spectral data display is changed to density data display. As illustrated in FIG. 18, the display adjusting unit 302 is capable of converting information on spectral data, such as cells, into density data based on the user input information in a state of extraction of desired spectral data by the data extracting unit 300 (see arrows in FIG. 18). In the density, the numbers of cells are shown on one axis, while fluorescence intensities are shown on the other axis, for example. Accordingly, the fine particle analyzing system of the embodiment is capable of easily changing spectral data display to density data display; therefore, usability of the system for the user in analysis of cell characters or the like increases.

According to the fine particle analyzing system of the embodiment as described above, the data extracting unit 300 is capable of selectively extracting only desired spectral data from a plurality of types of spectral data; therefore, easy separation of a plurality of types of spectral data is achievable. Moreover, the spectral data display method is adjustable by using the display adjusting unit 302. Accordingly, highly accurate and easy separation of a plurality of types of spectral data, and improvement of usability for the user in analysis based on the separated data are both achievable.

2. Second Embodiment

Figure 19:
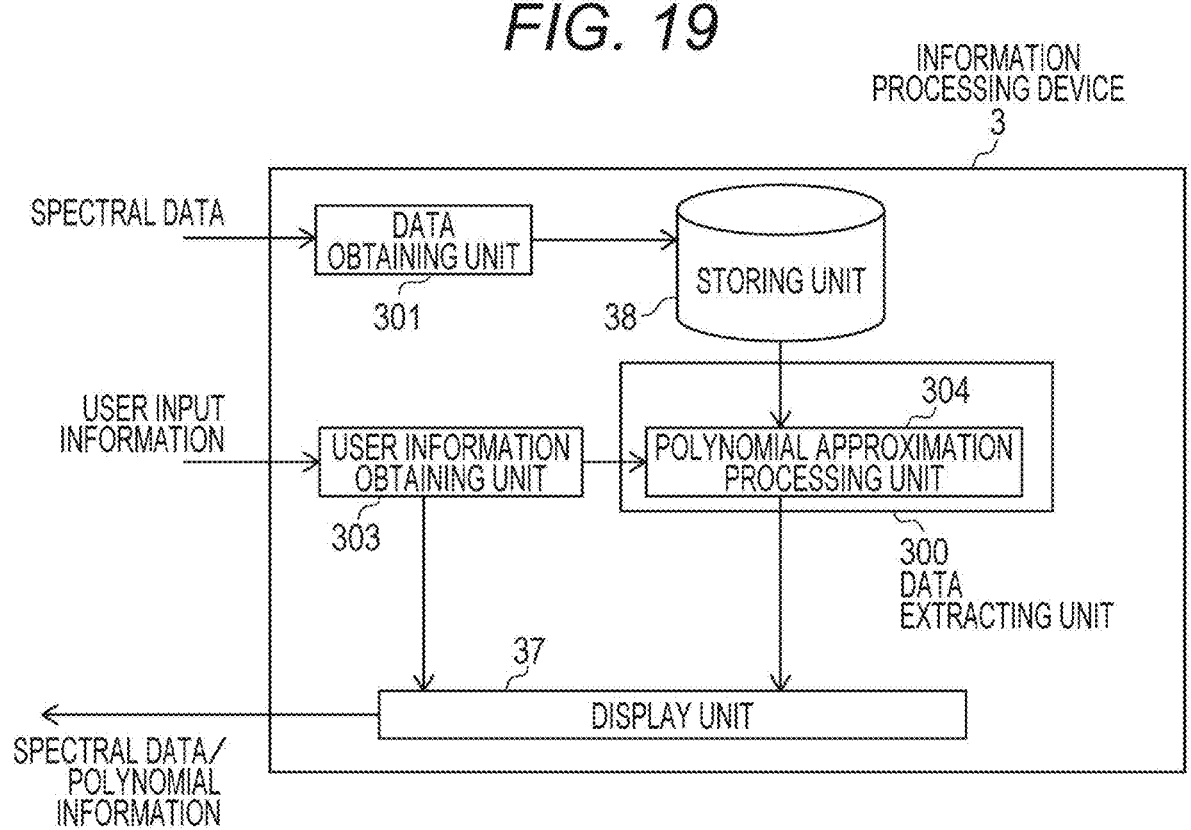
FIG. 19 is a block diagram illustrating a configuration example of the information processing device 3 of a fine particle analyzing system according to a second embodiment of the present disclosure.

A fine particle analyzing system according to the second embodiment of the present disclosure is hereinafter described. FIG. 19 is a block diagram illustrating a configuration example of an information processing device 3. The fine particle analyzing system according to the embodiment is substantially similar to the foregoing fine particle analyzing system according to the first embodiment of the present disclosure, except that a polynomial approximation processing unit 304 is provided on a data extracting unit 300 of the information processing device 3. Accordingly, only configuration and function of the polynomial approximation processing unit 304 are herein discussed. While FIG. 19 does not illustrate a display adjusting unit 302, the display adjusting unit 302 may be provided on the information processing device 3 of the fine particle analyzing system according to the second embodiment. In addition, while the polynomial approximation processing unit 304 is provided on the data extracting unit 300, processes similar to the processes detailed in the description of the first embodiment of the present disclosure may be executed by the data extracting unit 300.

(Polynomial Approximation Processing Unit 304)

The polynomial approximation processing unit 304 approximates spectral data to a polynomial at the time of selective extraction of spectral data, which contain predetermined information, from spectral data obtained by a data obtaining unit 301. This method allows easy separation of spectral data even when the spectral data obtained by the data obtaining unit 301 contains two or more types of spectral data exhibiting close wavelengths for the maximum fluorescence intensity.

Concerning the type of the polynomial used for approximation of spectral data is not particularly limited. For example, approximation of the polynomial approximation processing unit 304 may be conducted based on fitting of linear data to spectral data, which linear data corresponds to a polynomial stored in the storing unit 38 beforehand. For example, when the ratio of the pixel number of linear data on a polynomial to the pixel number where the linear data on the polynomial is fittable with the spectral data becomes a particular ratio or larger, the polynomial approximation processing unit 304 allows approximation of the spectral data as the corresponding polynomial.

When the polynomial used for approximation is a linear equation, respective spectra are easily determined solely based on the slope of the linear equation at the time of separation of a plurality of spectral data. Accordingly, it is preferable that the polynomial is a linear equation.

The polynomial approximation processing unit 304 may approximate each of the plurality of spectral data obtained at predetermined time intervals by the data obtaining unit 301 by approximation to a polynomial. When the polynomial is a linear equation, the user recognizes changes of a fine particle such as a cell with time, based on changes of the slope of the linear equation processed by the polynomial approximation processing unit 304; and utilizes the changes of the fine particle for characteristic analysis of cells or the like. Conditions such as time intervals for obtaining spectral data by the data obtaining unit 301 are not particularly limited, but may be arbitrarily determined based on the user input information in accordance with demands of the user, for example.

[Operation]

Figure 20:
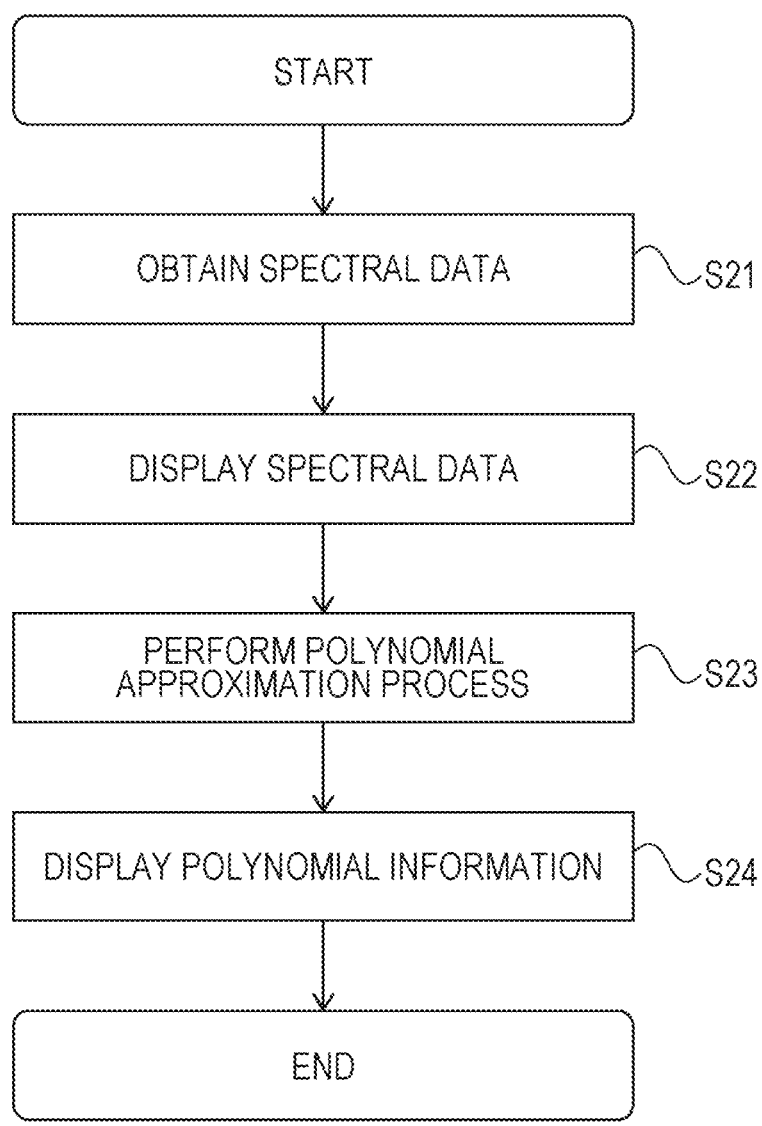
FIG. 20 is a flowchart showing an outline of a spectral data polynomial approximation method executed by the information processing device 3.

An example operation of the fine particle analyzing system according to the embodiment is hereinafter described. FIG. 20 is a flowchart showing an outline of a polynomial approximation processing method for spectral data executed by the information processing device 3.

Initially, similarly to the foregoing fine particle analyzing system according to the first embodiment of the present disclosure, the data obtaining unit 301 obtains, as spectral data, fluorescence intensity for each of a plurality of wavelengths detected by the detecting unit 22 via an input/output interface unit 34 (step S21). Then, a display unit 37 displays spectral data (step S22).

Subsequently, the polynomial approximation processing unit 304 approximates the spectral data to a polynomial (step S23). In this case, the spectral data subjected to approximation may be data already processed by the data extracting unit 300 or the display adjusting unit 302 of the fine particle analyzing system according to the first embodiment of the present disclosure. More specifically, first, the data extracting unit 300 selectively extracts a plurality of spectral data each indicating the maximum fluorescence intensity within a wavelength area set beforehand. Then, the polynomial approximation processing unit 304 approximates the plurality of extracted spectral data to a polynomial.

Figure 21:
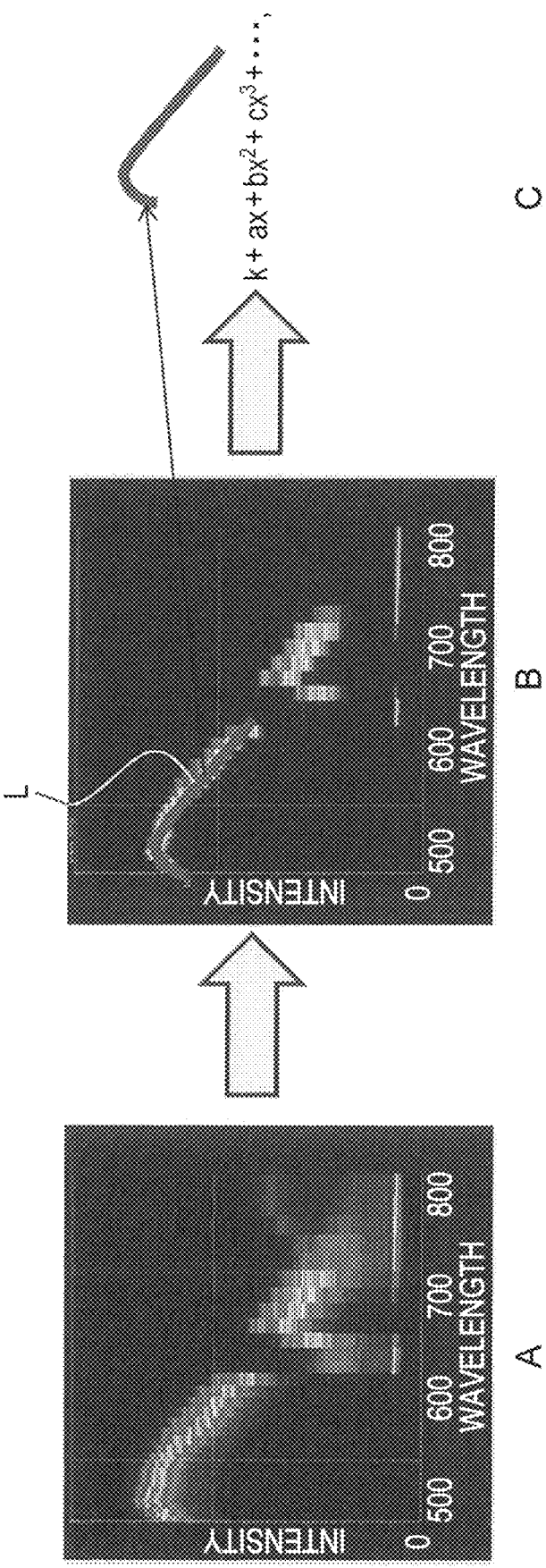
FIG. 21 is a graph as a substitute for a figure, showing an example of approximation of spectral data to a polynomial.

A specific example of the approximation of spectral data to a polynomial is herein described with reference to FIG. 21. FIG. 21 is a view illustrating an example of approximation of spectral data to a polynomial.

Initially, as illustrated in A of FIG. 21, the data obtaining unit 301 obtains spectral data. In this case, the data extracting unit 300 may selectively extract a plurality of spectral data each indicating the maximum fluorescence intensity within a wavelength area set beforehand.

Then, as illustrated in B of FIG. 21, the polynomial approximation processing unit 304 fits the spectral data to linear data (see reference sign L in the figure). As illustrated in C of FIG. 21, this method allows approximation of the spectral data to a predetermined polynomial ($y = k + ax + bx^2 + cx^3 \ldots$) representing this line. The linear data may be data stored in the storing unit 38 beforehand. The polynomial approximation processing unit 304 is capable of selecting a line fittable with spectral data at a particular ratio or larger. The particular ratio in this context is not particularly limited. For example, it may be a ratio of the pixel number of the linear data on a polynomial to the pixel number where the linear data on the polynomial is fittable with the spectral data. The information on the polynomial is allowed to be displayed on the display unit 37 by the display adjusting unit 302 (step S24 in FIG. 20).

Then, the polynomial approximation processing unit 304 is allowed to approximate each of the plurality of spectral data, which have been obtained by the data obtaining unit 301 at predetermined time intervals from an identical measurement object, to a polynomial. More specifically, processes similar to the foregoing processes executed in steps S21 to S24 are repeated at predetermined time intervals. The user may analyze changes of characteristics of a fine particle corresponding to a measurement object with time, based on changes of coefficients or the like of the polynomial with time.

Figure 22:
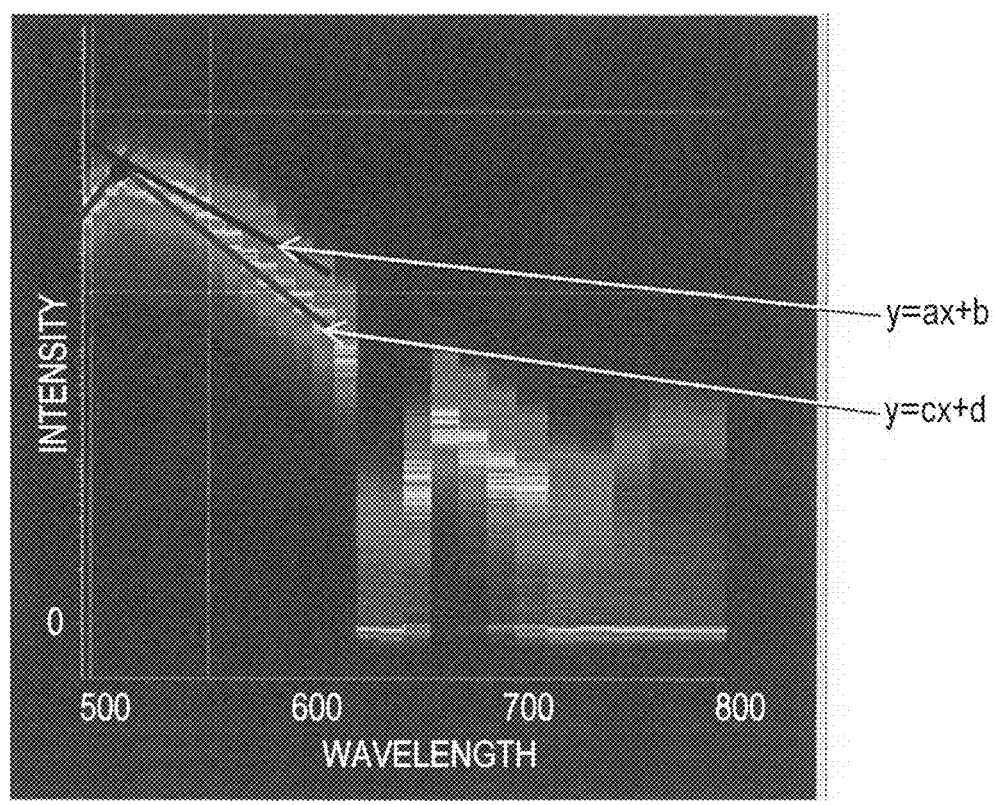
FIG. 22 is a graph as a substitute for a figure, showing an example of approximation of spectral data to linear equations.

FIG. 22 is a view illustrating an example of a state of overlap between two types of spectral data. It is preferable that a polynomial used by the polynomial approximation unit 304 for approximation of spectral data is a linear equation. Easy distinction between spectral data is achievable based on approximation of spectral data to a linear equation and evaluation of only the slope of the linear equation executed by the polynomial approximation unit 304. It is preferable that a line of the linear equation comes into contact with a curve of spectral data at a wavelength corresponding to the maximum fluorescence intensity in target spectral data.

According to an example shown in FIG. 22, the polynomial approximation processing unit 304 is capable of approximating two types of spectral data, which exhibit close wavelengths for the maximum fluorescence intensity, to two linear equations ($y = ax + b$, $y = cx + d$). Then, the polynomial approximation processing unit 304 is capable of distinguishing the two types of spectral data based on information on slopes a and c of the equations. The user is capable of easily analyzing a measurement object only based on the information on the slopes of the equations. The information on the slopes is allowed to be displayed on the display unit 37 by the display adjusting unit 302.

Figure 23:
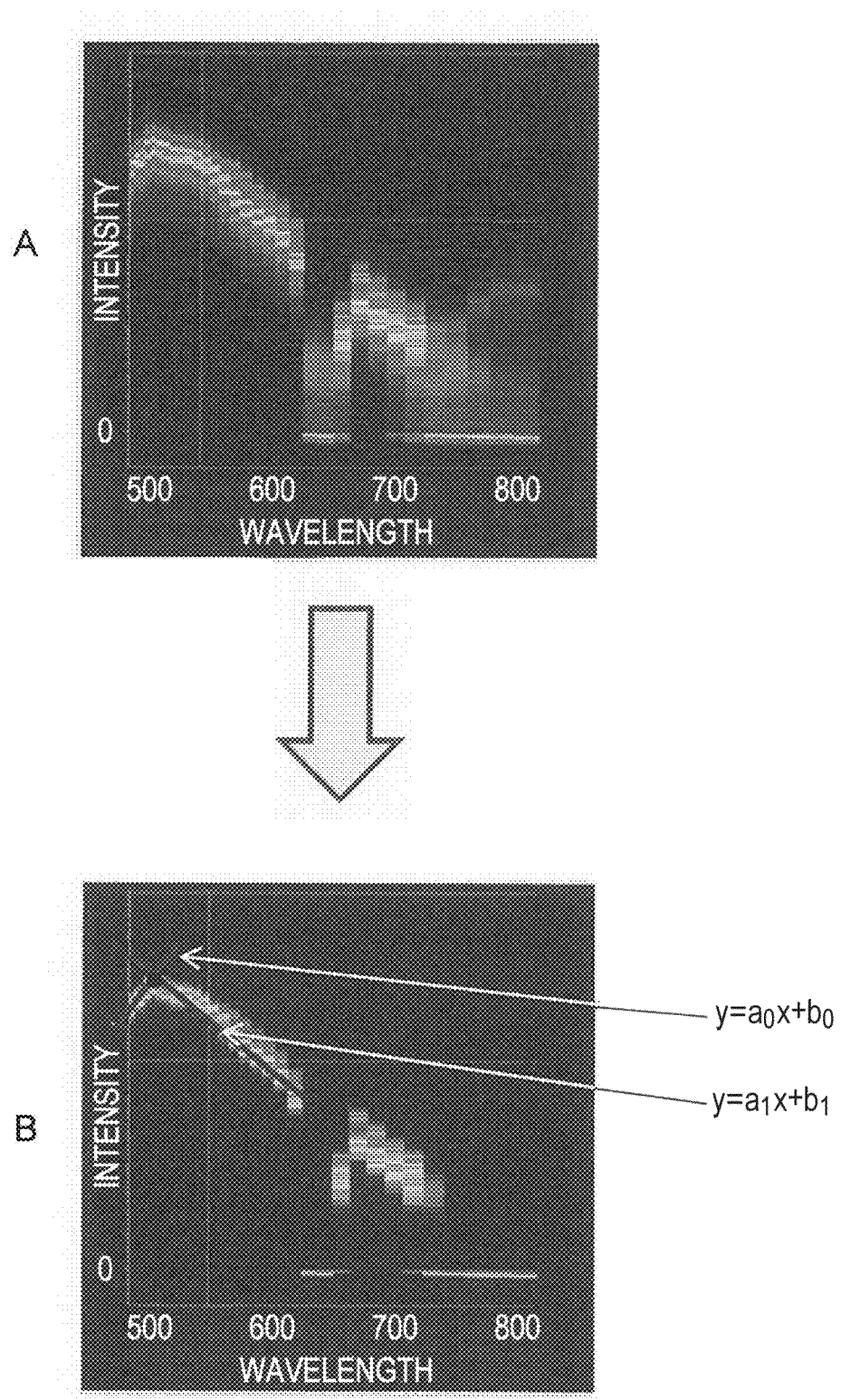
FIG. 23 is a graph as a substitute for a figure, showing an example of approximation of spectral data to linear equations.

FIG. 23 is a view illustrating an example of approximation of spectral data to linear equations. The polynomial approximation processing unit 304 is capable of approximating spectral data obtained in A of FIG. 23 as two types of linear equations ($y = a_0 x + b_0$, $y = a_1 x + b_1$) coming into contact with each other at a peak value of fluorescence intensity as illustrated in B of FIG. 23. As discussed herein, two types of linear equations are obtainable for each of spectral data. Accordingly, when one of slopes of two linear equations obtained by approximation of either of two types of spectral data indicates a value close to the corresponding value of the other of the spectral data in distinguishing the two types of spectral data, the two types of spectral data may be distinguished by comparison of the other linear equation.

As described above, the fine particle analyzing system according to the embodiment approximates spectral data to a polynomial. This method allows easy distinction and separation of two or more types of spectral data exhibiting close wavelengths for the maximum fluorescence intensity. In addition, the fine particle analyzing system according to the embodiment easily analyzes changes of characteristics of a fine particle corresponding to a measurement object with time. Furthermore, the fine particle analyzing system according to the embodiment performs the process for approximating spectral data to a polynomial as detailed in the embodiment, as well as the process executed by the data extracting unit 300 as detailed in the first embodiment of the present disclosure. Accordingly, more accurate separation of a plurality of types of spectral data is achievable.

3. Third Embodiment

Figure 24:
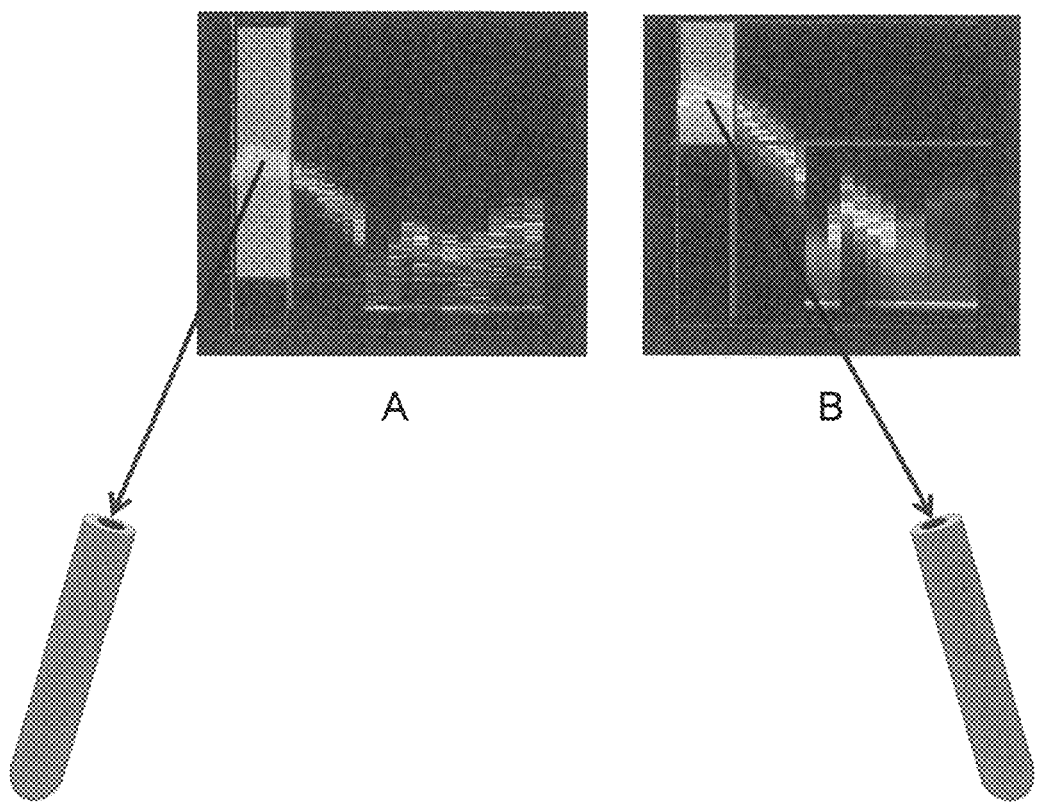
FIG. 24 is a graph as a substitute for a figure, showing a state of sorting based on spectral data executed by a fine particle analyzing system according to a third embodiment of the present disclosure.

A fine particle analyzing system according to the third embodiment of the present disclosure is hereinafter described. FIG. 24 is a view illustrating a concept of sorting based on spectral data according to the fine particle analyzing system of this embodiment. According to fine particle analysis of the embodiment, sorting of fine particles is allowed based on spectral data extracted from a plurality of types of spectral data as illustrated in FIG. 24. The fine particle analyzing system according to the embodiment is substantially similar to each of the fine particle analyzing systems according to the first and second embodiments, except that sorting of fine particles is allowed based on spectral data. Accordingly, only the different configuration and function are herein discussed.

Figure 25:
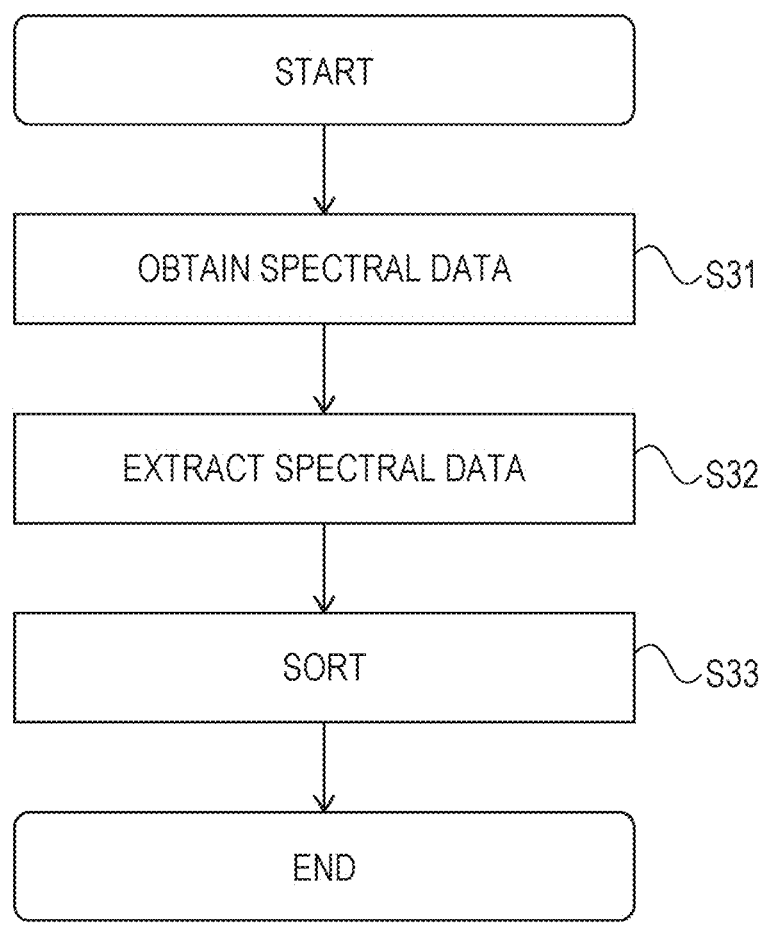
FIG. 25 is a flowchart showing an outline of a sorting method executed by the fine particle analyzing system according to the third embodiment.

FIG. 25 is a flowchart showing an outline of overall operation of the fine particle analyzing system according to the third embodiment. Initially, a data obtaining unit 301 obtains spectral data showing fluorescence intensity for each of a plurality of wavelengths detected by a detecting unit 22 of a fine particle analyzing apparatus 1 via an input/output interface unit 34 (step S31). Then, a data extracting unit 300 extracts desired spectral data in a manner similar to the foregoing method according to the first embodiment of the present disclosure (step S32). A sorting unit 21 of the fine particle analyzing apparatus 1 performs sorting based on the extracted spectral data (step S33).

As described above, the fine particle analyzing system according to the embodiment performs a fine particle sorting process based on a spectral data extracting process. Accordingly, accurate sorting of fine particles is achievable.

4. Fourth Embodiment

Figure 26:
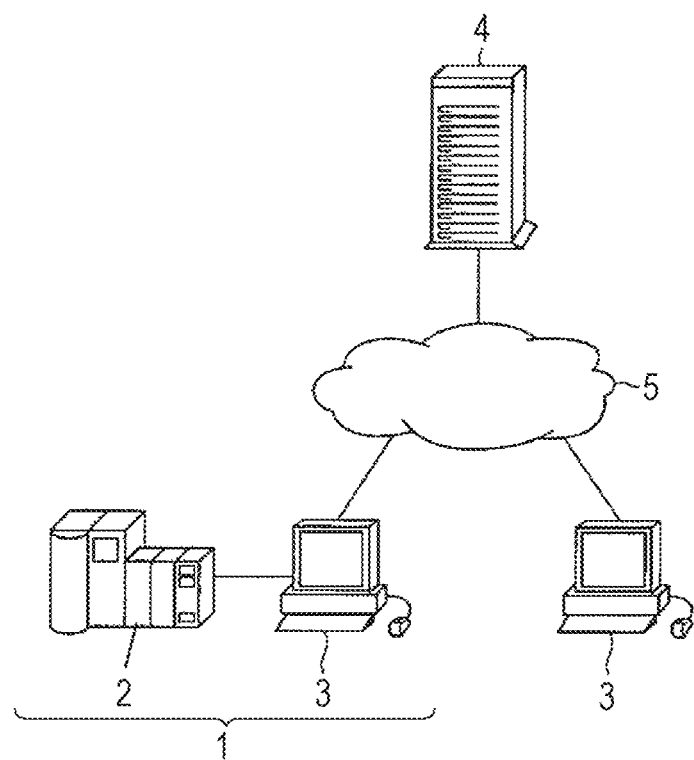
FIG. 26 is a view illustrating an outline of a fine particle analyzing system according to a fourth embodiment of the present disclosure.

A fine particle analyzing system according to the fourth embodiment of the present disclosure is hereinafter described. FIG. 26 is a view illustrating an outline of the fine particle analyzing system according to this embodiment. The fine particle analyzing system according to the embodiment uses different devices for sorting and detecting fine particles and for analyzing the fine particles. More specifically, a fine particle analyzing apparatus 1 includes a fine particle measuring device 2 which sorts and detects fine particles, and an information processing device 3 which performs data analysis.

The fine particle measuring device 2 sorts and detects fine particles. The fine particle measuring device 2 includes a sorting unit which sorts fine particles and a detecting unit for detecting fluorescence of the fine particles. The configurations and functions of the sorting unit and the detecting unit herein are substantially similar to the configurations and functions of the sorting unit 21 and the detecting unit 22 of the fine particle analyzing system according to the first embodiment of the present disclosure.

The configuration of the information processing device 3 is similar to the configuration of the information processing device 3 according to the first embodiment of the present disclosure. Other configurations and effects in this embodiment are similar to the corresponding configurations and effects of the first to third embodiments of the present disclosure.

The effects described herein are presented only by way of example. Accordingly, effects produced by the present disclosure are not limited to those described herein but may include other effects.

The present disclosure may have the following configurations.

(1)
A fine particle analyzing apparatus including a data extracting unit that selectively extracts spectral data, which contain predetermined information, from spectral data on fluorescence emitted from a fine particle.

(2)
The fine particle analyzing apparatus according to the paragraph (1), wherein the data extracting unit selectively extracts spectral data indicating the maximum intensity in a wavelength area set beforehand from one or a plurality of types of spectral data indicating intensity of fluorescence emitted from the fine particle for each of a plurality of wavelengths.

(3)
The fine particle analyzing apparatus according to the paragraph (2), wherein the data extracting unit removes spectral data indicating the maximum intensity lower than a predetermined intensity from the one or the plurality of types of spectral data.

(4)
The fine particle analyzing apparatus according to the paragraph (2) or (3), including
a display adjusting unit that allows display of the one or the plurality of spectral data, wherein,
the display adjusting unit allows selective display of the spectral data when the spectral data has been extracted by the data extracting unit.

(5)
The fine particle analyzing apparatus according to the paragraph (4), further including
a data obtaining unit that obtains the one or the plurality of spectral data, wherein
the display adjusting unit allows overlapped display of the spectral data obtained by the data obtaining unit.

(6)
The fine particle analyzing apparatus according to the paragraph (5), wherein the display adjusting unit varies display colors of the spectral data in accordance with frequency of overlap between the spectral data.

(7)
The fine particle analyzing apparatus according to the paragraph (5) or (6), wherein the display adjusting unit changes display of the spectral data to display of histogram data showing frequency distribution of the fine particle.

(8)
The fine particle analyzing apparatus according to the paragraph (6), wherein the display adjusting unit allows selective display of the spectral data exhibiting overlap frequency within a predetermined range.

(9)
The fine particle analyzing apparatus according to any of the paragraphs (2) to (8), including
a user information obtaining unit that obtains user input information containing information on the wavelength range, wherein
the data extracting unit selectively extracts the spectral data based on the user input information.

(10)
The fine particle analyzing apparatus according to any of the paragraphs (1) to (9), wherein the data extracting unit includes a polynomial approximation processing unit that approximates the spectral data to a polynomial.

(11)
The fine particle analyzing apparatus according to the paragraph (10), wherein the polynomial is a linear equation.

(12)
The fine particle analyzing apparatus according to the paragraph (10) or (11), further including
a data obtaining unit that obtains a plurality of the spectral data from an identical object at predetermined time intervals, wherein
the polynomial approximation processing unit approximates each of the plurality of spectral data, which have been obtained by the data obtaining unit at the predetermined time intervals, to a polynomial.

(13)
The fine particle analyzing apparatus according to any of the paragraphs (1) to (12), including a detecting unit that detects fluorescence emitted from the fine particle.

(14)
The fine particle analyzing apparatus according to the paragraph (13), including a sorting unit that sorts the fine particle based on the spectral data extracted by the data extracting unit.

(15)
A fine particle analyzing method including:
by use of a data extracting unit, selectively extracting spectral data, which contain predetermined information, from spectral data on fluorescence emitted from a fine particle.

(16)
A program which causes a fine particle analyzing apparatus to perform a function of selectively extracting spectral data, which contain predetermined information, from spectral data on fluorescence emitted from a fine particle.

(17)
A fine particle analyzing system including:
a fine particle analyzing apparatus that includes a data extracting unit which selectively extracts spectral data from spectral data on fluorescence emitted from a fine particle, the spectral data containing predetermined information.

(18)

The fine particle analyzing system according to the paragraph (17), wherein the fine particle analyzing apparatus includes a detecting unit that detects fluorescence emitted from the fine particle.

(19)

The fine particle analyzing system according to the paragraph (18), including a server that includes an information storing unit configured to store one or a plurality of spectral data indicating intensity of fluorescence detected by the detecting unit of the fine particle analyzing apparatus for each of a plurality of wavelengths.

REFERENCE SIGNS LIST 1 fine particle analyzing apparatus
2 fine particle measuring device
3 information processing device
4 server
5 network
21 sorting unit
22 detecting unit
30 CPU
31 ROM
32 RAM
33 bus
34 input/output interface unit
35 communicating unit
36 input unit
37 display unit
38 storing unit
300 data extracting unit
301 data obtaining unit
302 display adjusting unit
303 user information obtaining unit
304 polynomial approximation processing unit

The invention claimed is:

1. A particle analyzing apparatus comprising:
   circuitry configured to function as:
      a user information obtaining unit configured to obtain at least one user input indicating a wavelength area of first spectral data on fluorescence emitted from a particle;
      a data extracting unit configured to selectively extract, from the first spectral data, second spectral data based on a maximum intensity of the first spectral data, wherein the maximum intensity is lower than a threshold intensity in the wavelength area indicated in the at least one user input; and
      a display adjusting unit configured to:
         display the first spectral data and/or selectively display the second spectral data;
         display at least one graphical user interface; and
         display at least one line cursor extending along at least two directions on the at least one graphical user interface,
      wherein the at least one line cursor indicates the threshold intensity, and
      wherein the particle comprises at least one of:
         a cell;
         a microbe;
         a liposome;
         a chromosome;
         a nucleic acid;
         a protein;
         a polymer;
         a latex particle; and
         a gel particle.

2. The particle analyzing apparatus according to claim 1, wherein the data extracting unit is configured to selectively extract the second spectral data, which indicates the maximum intensity in the wavelength area indicated in the at least one user input from one or a plurality of types of first spectral data indicating intensity of fluorescence emitted from the particle for each of a plurality of wavelengths.

3. The particle analyzing apparatus according to claim 2, wherein the data extracting unit is configured to remove third spectral data indicating the maximum intensity lower than a predetermined intensity from the one or the plurality of types of first spectral data.

4. The particle analyzing apparatus according to claim 2, wherein
   the display adjusting unit is configured to allow display of the one or the plurality of types of first spectral data, wherein
   when the second spectral data has been extracted by the data extracting unit, the display adjusting unit is configured to allow selective display of the extracted second spectral data.

5. The particle analyzing apparatus according to claim 4, comprising
   a data obtaining unit configured to obtain the one or the plurality of types of first spectral data, wherein
   the display adjusting unit is configured to allow overlapped display of the first spectral data obtained by the data obtaining unit.

6. The particle analyzing apparatus according to claim 5, wherein the display adjusting unit is configured to vary display colors of the first spectral data in accordance with frequency of overlap between the first spectral data.

7. The particle analyzing apparatus according to claim 6, wherein the display adjusting unit is configured to allow selective display of the first spectral data exhibiting overlap frequency within a predetermined range.

8. The particle analyzing apparatus according to claim 5, wherein the display adjusting unit is configured to change display of the first spectral data to display of histogram data showing frequency distribution of the particle.

9. The particle analyzing apparatus according to claim 1, wherein the data extracting unit includes a polynomial approximation processing unit that is configured to approximate the first spectral data to a polynomial.

10. The particle analyzing apparatus according to claim 9, wherein the polynomial is a linear equation.

11. The particle analyzing apparatus according to claim 9, further comprising
   a data obtaining unit configured to obtain a plurality of the first spectral data from an identical object at predetermined time intervals, wherein
   the polynomial approximation processing unit is configured to approximate each of the plurality of first spectral data, which have been obtained by the data obtaining unit at the predetermined time intervals, to a polynomial.

12. The particle analyzing apparatus according to claim 1, comprising a detecting unit configured to detect fluorescence emitted from the particle.

13. The particle analyzing apparatus according to claim 12, comprising a sorting unit configured to sort the particle based on the second spectral data extracted by the data extracting unit.

14. At least one non-transitory computer-readable storage medium encoded with executable instructions that, when executed by at least one processor, cause the at least one processor to perform a method comprising:
  causing a particle analyzing apparatus to perform a function of obtaining at least one user input indicating a wavelength area of first spectral data on fluorescence emitted from a particle;
  causing the particle analyzing apparatus to perform a function of selectively extracting, from the first spectral data, second spectral data based on a maximum intensity of the first spectral data, wherein the maximum intensity is lower than a threshold intensity in the wavelength area indicated in the user input; and
  causing the particle analyzing apparatus to perform a function of:
    displaying the first spectral data and/or selectively displaying the second spectral data;
    displaying at least one graphical user interface; and
    displaying at least one line cursor extending along at least two directions on the at least one graphical user interface,
  wherein the at least one line cursor indicates the threshold intensity, and
  wherein the particle comprises at least one of:
    a cell;
    a microbe;
    a liposome;
    a chromosome;
    a nucleic acid;
    a protein;
    a polymer;
    a latex particle; and
    a gel particle.

15. A particle analyzing system comprising:
  a particle analyzing apparatus that includes circuitry configured to function as:
    a data obtaining unit configured to obtain first spectral data on fluorescence emitted from a particle; and
    a user information obtaining unit that obtains at least one user input indicating a wavelength area of the first spectral data; and
    a data extracting unit configured to selectively extract second spectral data from the first spectral data based on a maximum intensity of the first spectral data, wherein the maximum intensity is lower than a threshold intensity in the wavelength area indicated in the at least one user input; and
    a display adjusting unit configured to:
      display the first spectral data and/or selectively display the second spectral data;
      display at least one graphical user interface; and
      display at least one line cursor extending along at least two directions on the at least one graphical user interface,
  wherein the at least one line cursor indicates the threshold intensity, and
  wherein the particle comprises at least one of:
    a cell;
    a microbe;
    a liposome;
    a chromosome;
    a nucleic acid;
    a protein;
    a polymer;
    a latex particle; and
    a gel particle.

16. The particle analyzing system according to claim 15, wherein the particle analyzing apparatus includes a detecting unit configured to detect the fluorescence emitted from the particle.

17. The particle analyzing system according to claim 16, comprising a server that includes an information storing unit configured to store one or a plurality of spectral data indicating intensity of fluorescence detected by the detecting unit of the particle analyzing apparatus for each of a plurality of wavelengths.

18. The particle analyzing system according to claim 17, wherein the server generates the at least one graphical user interface.

* * * * *